(12) United States Patent
Sigrist

(10) Patent No.: US 12,552,615 B2
(45) Date of Patent: Feb. 17, 2026

(54) CONVEYING DEVICE

(71) Applicant: FERAG AG, Hinwil (CH)

(72) Inventor: Sergio Sigrist, Hinwil (CH)

(73) Assignee: FERAG AG, Hinwil (CH)

( * ) Notice: Subject to any disclaimer, the term of this patent is extended or adjusted under 35 U.S.C. 154(b) by 65 days.

(21) Appl. No.: 18/721,599

(22) PCT Filed: Dec. 22, 2022

(86) PCT No.: PCT/EP2022/087493
§ 371 (c)(1),
(2) Date: Jun. 18, 2024

(87) PCT Pub. No.: WO2023/118442
PCT Pub. Date: Jun. 29, 2023

(65) Prior Publication Data
US 2025/0074716 A1    Mar. 6, 2025

(30) Foreign Application Priority Data
Dec. 22, 2021    (CH) ............................... 070783/2021

(51) Int. Cl.
*B65G 43/10*    (2006.01)
*B65G 43/08*    (2006.01)
(Continued)

(52) U.S. Cl.
CPC ............. *B65G 43/08* (2013.01); *B65G 43/10* (2013.01); *B65G 47/31* (2013.01); *B65G 47/52* (2013.01); *B65G 2811/0631* (2013.01)

(58) Field of Classification Search
CPC ........ B65G 43/08; B65G 43/10; B65G 47/31; B65G 47/52; B65G 2811/0631
(Continued)

(56) References Cited

U.S. PATENT DOCUMENTS

2008/0023302 A1*   1/2008   Groom ................. B65G 47/268
                                                      198/781.06
2009/0065330 A1     3/2009   Lupton et al.
(Continued)

FOREIGN PATENT DOCUMENTS

DE    695 06 499 T2    4/1999
DE    695 06 499 T3    6/2006
(Continued)

OTHER PUBLICATIONS

EPO (Rijswijk, NL), English version of the International Search Report, Form PCT/ISA/210, for corresponding International Application PCT/EP2022/087493, Apr. 19, 2023 (2 pp.).

*Primary Examiner* — Gene O Crawford
*Assistant Examiner* — Lester Rushin, III
(74) *Attorney, Agent, or Firm* — Pauley Erickson & Swanson

(57) ABSTRACT

A method and a device for transferring piece good (S, $S_v$, $S_n$) accurate in phase, delivered by a delivery device along a conveying direction (x) and the respective functional length (Lf) and a moment of delivery (t1) of the respective piece good (S, $S_v$, $S_n$) being detected at or upstream of a transfer section of the delivery device. The delivered piece good (S, $S_v$, $S_n$) is transferred from the transfer section of the delivery device accurately in cycle to a distancing device, which includes distancing conveyors along the conveying direction (x). The speed of each of the distancing conveyors is individually controlled by a transfer section of the distancing device for the transfer of the piece good(S) accurate in phase. The respective piece good (S, $S_v$, $S_n$) is transferred from the transfer section of the spacing conveyor to a discharge device accurate in phase.

25 Claims, 7 Drawing Sheets

(51) Int. Cl.
*B65G 47/31* (2006.01)
*B65G 47/52* (2006.01)

(58) Field of Classification Search
USPC .......................................................... 198/348
See application file for complete search history.

(56) References Cited

U.S. PATENT DOCUMENTS

| | | | | |
|---|---|---|---|---|
| 2015/0360877 A1* | 12/2015 | Shin | ........................ | G06V 20/64 |
| | | | | 382/103 |
| 2016/0001983 A1* | 1/2016 | Ooba | ..................... | B65G 37/00 |
| | | | | 414/787 |
| 2025/0074716 A1* | 3/2025 | Sigrist | .................... | B65G 47/52 |

FOREIGN PATENT DOCUMENTS

| | | |
|---|---|---|
| EP | 0 305 755 A2 | 3/1989 |
| EP | 0 343 613 A2 | 11/1989 |
| EP | 0 619 248 A1 | 10/1994 |
| EP | 0 811 567 A2 | 12/1997 |
| EP | 1 220 719 A2 | 7/2002 |
| EP | 2 522 602 A1 | 11/2012 |
| EP | 3 521 217 A1 | 8/2019 |
| EP | 3 915 906 A1 | 12/2021 |
| JP | 2000-185817 A | 7/2000 |
| JP | 2000185817 * | 7/2000 |
| JP | 2011-105436 A | 6/2011 |
| WO | WO 01/24947 A2 | 4/2001 |
| WO | WO 2015/179722 A1 | 11/2015 |
| WO | WO 2021/113594 A1 | 6/2021 |

* cited by examiner

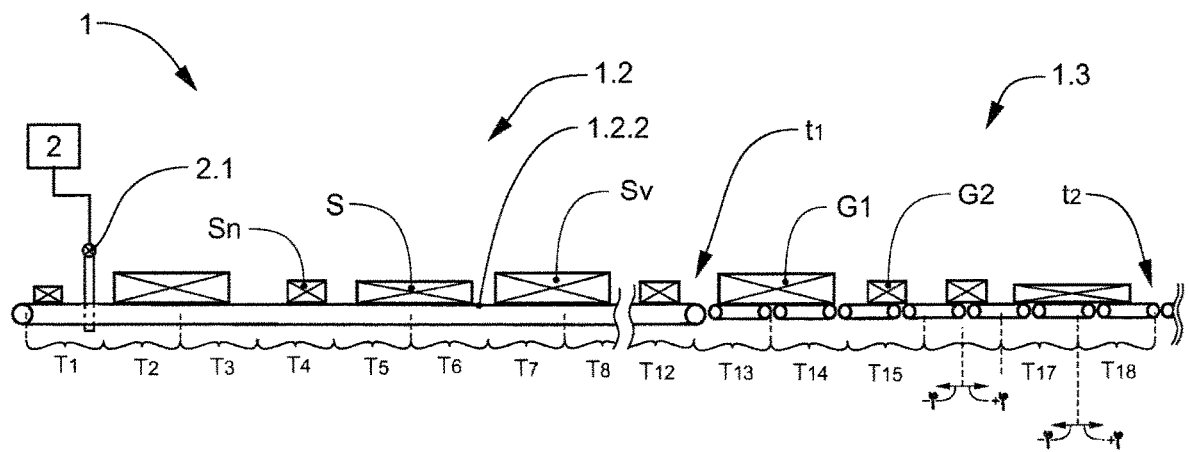
Fig. 3
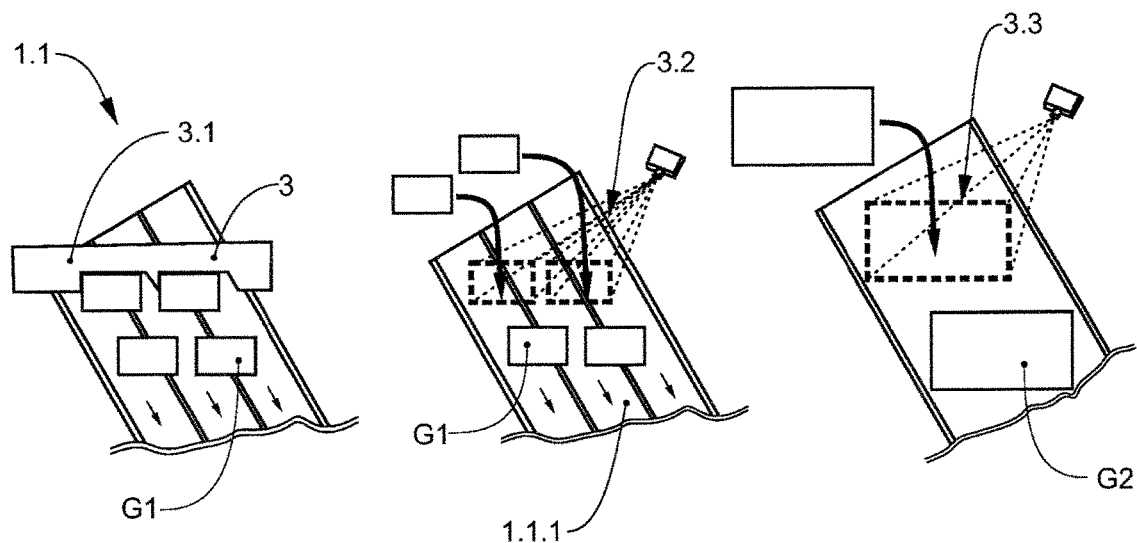
Fig. 4a   Fig. 4b   Fig. 4c

CONVEYING DEVICE

CROSS REFERENCE TO RELATED APPLICATION

This application is a National Phase filing in the United States, under 35 USC § 371, of PCT International Patent Application PCT/EP2022/087493, filed on 22 Dec. 2022 which claims the priority of Swiss Patent Application No. CH 070783/2021, filed 22 Dec. 2021.

The above-referenced applications are hereby incorporated by reference herein in their entirety and are made a part hereof, including but not limited to those portions which specifically appear hereinafter.

BACKGROUND OF THE INVENTION

Field of the Invention

The present disclosure is in the field of conveying systems and methods for operating them.

Discussion of Related Art

The following conveying systems are known from the prior art.

WO 2015179722 A1 published Nov. 26, 2015, in the name of Intelligrated Headquaters LLC, relates to systems and methods for providing a desired spacing between articles within a continuously flowing train of articles. Various embodiments of methods may comprise operating a material handling system having a plurality of conveyor units by generating motion profiles for a plurality of articles to provide a predetermined spacing between the articles, and controlling the plurality of conveyor units to move each article according to its motion profile as the plurality of articles move through the material handling system.

US2008023302 A1 published Jan. 31, 2008, in the name of Dematic Corp., relates to a screw conveying system and method comprising providing a conveying surface defined by a plurality of tandem zones, each of said zones including an article sensor and a position encoder. The encoder generates a position signal proportional to the movement of the articles in that zone. The article sensor detects the articles in this zone. For an item in a zone, a target position is set depending on the position of an item downstream from that item in the direction of item flow. The speed of this zone is adjusted to move the item towards its target position, so that the gaps between items are adjusted as the items are transported.

EP 2522602 A1 published on Nov. 14, 2012, in the name of Toyokanetsu Solutions, relates to an accumulation conveyor which reduces the distance between objects to be conveyed by an accumulation conveyor so as to improve its efficiency and conveying performance. The accumulation conveyor 10 according to the present disclosure comprises a motor 20, provided for each zone Z, for driving a carrier roller 18 constituting the zone Z to rotate; a sensor 22, provided for each zone Z, for detecting the passing of an article C to be conveyed; and a control unit 26 for estimating a distance information regarding the distance between the articles according to the detection information of two adjacent articles C1, C2 detected by the sensor 22, and for switching when the estimated distance information falls within a predetermined range, a control input to a motor $20n$ of a zone $Zn$ conveying the object C2 at the rear side on the upstream side or to a motor $20n+1$ of a zone $Zn+1$ adjacent thereto downstream so that the zone $Zn$ has a faster conveying speed than that of the zone $Zn+1$.

SUMMARY OF THE INVENTION

Conveying systems and methods for operating them are known for various applications. Particularly when conveying piece good, such as parcels in parcel centers, the problem is often that the piece good usually has to be delivered in a specific sequence and accurate in cycle. A typical application is the delivery of parcels in a specific sequence to a continuously running, downstream process, which parcels were originally in a random order.

Tray conveyors are typically used as discharge devices. In particular, for conveying parcels within parcel centers, sometimes over distances of several hundred meters. Due to the large moving masses and the associated mechanical load and the large amount of energy required for acceleration or deceleration, it is not economical to operate these system components dynamically. For this reason, tray conveyors are usually operated at an essentially constant speed.

Tray conveyors therefore usually set the pace for the entire conveying system. A typical tray conveyor comprises a circulating chain on or around which a large number of individual box-shaped conveyor trays circulate. As these conveyor trays, in contrast to other conveying devices such as belt conveyors, do not have a continuous contact surface for the goods to be transported, the goods usually have to be fed in a sequenced and accurate manner. Otherwise, faults can occur, such as piece good falling out of the conveying system or jamming between individual conveyor trays. In the worst case scenario, this can lead to the destruction of the piece good to be conveyed or even damage and the resulting failure of the conveying system concerned.

In addition to feeding of the piece good accurate in phase, it is also desirable to achieve the most continuous feeding possible. In the context of the present disclosure, continuous feeding is to be understood in a manner that no product-less sections remain during feeding and/or delivery and therefore trays remain unoccupied during removal. This serves to achieve economically efficient feeding. Typically, tray conveyors comprise hundreds or even thousands of conveyor trays. As tray conveyors are usually the heart of the conveying system, the efficiency of the downstream process steps and devices depends to a large extent on the efficient loading of the tray conveyor.

One objective of the disclosure can be seen in enabling a delivery to the discharge device that is accurate in phase.

Another objective can be seen in providing the piece good correctly aligning and within cycles.

A basic distinction is made between the cycle of the device which defines the work cycle of the overall system and the delivery cycle. A cycle is to be understood as a length along the conveying direction, which is defined by a discharge device arranged downstream. The cycle also has a time component in that it represents a time window depending which is related to the speed.

In a preferred embodiment, the conveying system comprises a discharge device in the form of a tray conveyor. Due to its inertia and continuous conveying, the tray conveyor typically represents the "cycle generator" (master) for the entire conveying system and therefore defines the work cycle for the entire conveying system. As a result, the devices upstream of the tray conveyor usually have to operate according to the work cycle of the tray conveyor. In the case of a tray conveyor as the cycle generator, a cycle within the work cycle is to be understood as the length of a conveyor tray along the conveying direction plus the distance between the conveyor tray and the following conveyor tray along the conveying direction.

The delivery cycle, on the other hand, is to be understood as the cycle of the delivered piece good. The delivery cycle is to be understood as the functional length of a piece good plus the distance between the piece good and a subsequent piece good following upstream along the conveying direction. The functional length corresponds to the respective measured length of a piece good along the conveying direction.

Ideally, the delivery cycle already corresponds to the cycle of the work cycle. However, this is not always possible due to the different sizes and dimensions of the delivered piece good, as well as economical process control, as accurate in cycle provision would require too much control effort.

However, accurate in cycle delivery is not sufficient to ensure that the piece good is actually transferred to the downstream discharge device in the correct position. As defined above, a cycle within the work cycle in the case of a tray conveyor as a cycle generator is defined as the length of a conveyor tray along the conveying direction plus the distance between the conveyor tray and the following conveyor tray along the conveying direction. In extreme cases, a piece good, such as a package with a very small functional length, although it is delivered within the cycle and thus accurate in cycle, would not come to rest within the conveyor tray when it is transferred to the discharge device, but at the distance between the conveyor tray and the following conveyor tray, i.e. between two conveyor trays. In this borderline case, this could result in damage to the piece good or the conveying system.

Consequently, in addition to accurate in cycle delivery, accurate in phase delivery should also be ensured. By definition, a phase lies within a cycle. In the case of a tray conveyor, the phase is to be understood as the effective length of the conveyor tray minus a safety distance to the two tray walls arranged in the conveying direction.

Typically, the length of the phase corresponds to a maximum of 90% of the length of the conveyor tray along the conveying direction. The effective length of the piece good to be conveyed should not exceed this length. At the same time, however, piece good can also be conveyed with a length essentially corresponding to twice the length of the tray. In this case, the phase corresponds to 90% of the length of two consecutive conveyor trays along the conveying direction. As a conclusion, the phase can be understood as a sub-unit of the cycle.

Good results can be achieved if the phase is integrated into the cycle in such a way that a safety buffer remains in the form of a distance or time interval. In the specific case of a tray conveyor, the phase is typically defined in such a way that it is assigned within the conveyor trays with a safety distance to the tray walls.

The method according to the disclosure is used for transferring piece good accurate in phase. In the following, for reasons of consistency, piece good is always referred to in the singular. However, the method and the conveying system typically transport several items of piece good. To carry out the method according to the disclosure, the conveying system comprises a delivery device for delivering the piece good along a conveying direction. The delivery device is typically a belt conveyor of any given length.

Good results can be achieved, if the delivery device can be accelerated or decelerated. This is to be understood that if the speed of the downstream steps, usually the discharge device, is varied, the speed of the delivery device can be matched to its speed. In a preferred embodiment, a deviation of the delivery cycle from the cycle within the work cycle of 20% is typically tolerated. Deviations of more than 20% can be compensated for with an increased number of distancing conveyors. With each belt conveyor, essentially 20% of the spacing within a cycle can be corrected.

As already described at the beginning, piece good of different sizes is usually conveyed. In order to be able to adapt the conveying system to the respective piece good, it typically comprises a control unit with a sensor for detecting a respective functional length and a moment of delivery of the respective piece good. If, for example, a square or rectangular piece good, for example in the form of a package, is positioned diagonally on the delivery device, the functional length corresponds to the diagonal length of the package, measured along a straight line parallel to the conveying direction.

A transfer section of the delivery device is configured to transfer the delivered piece good to a distancing device. In the case of a belt conveyor, the transfer section of the delivery device is the section of the conveyor belt that is adjacent to the distancing device along the conveying direction. Conveyor belts with a belt width of between 300 mm and 1000 mm are typically used, preferably with a width of between 400 mm and 700 mm.

In this context, adjacent is to be understood that there is a gap between the delivery device and the distancing device, which gap is many times smaller than the smallest piece good to be transported. Typical dimensions of the piece good to be transported are in an interval between at least 50 mm width and 50 mm length up to 800 mm width and 600 mm length.

Preferably, the dimensions of the piece good to be transported are in an interval between at least 100 mm width and 100 mm length up to 600 mm width and 400 mm length. The length corresponds to the functional length, which is measured along the conveying direction. The width corresponds to the dimension of the piece good, which is measured perpendicular to the conveying direction.

The distancing device of the conveying system typically comprises a plurality of distancing conveyors, arranged subsequently along the conveying direction. In order to be able to influence the distance between two items of piece good, following one another along the conveying direction, the speed of each of the distancing conveyors of the plurality of distancing conveyors can be controlled for transferring the piece good accurate in phase from a transfer section of the distancing device to a discharge device.

In a preferred embodiment, the distancing conveyors are belt conveyors. Like the delivery device, the conveyor belts of the distancing conveyors have a belt width of between 300 mm and 1000 mm, preferably a width of between 400 mm and 700 mm.

The plurality of distancing conveyors of the distancing device are preferably arranged one behind the other and adjacent to each other along the conveying direction. There is also usually only a gap of a few millimetres to a few centimetres between the individual distancing conveyors. The piece good is delivered along the conveying direction by a delivery device and transferred from the transfer section of the delivery device to the first distancing conveyor arranged adjacent to the transfer section of the delivery device in the conveying direction.

In a preferred embodiment, a sensor is arranged upstream or in the area of the transfer section of the delivery device and is communicatively connected to a control unit. In addition to the high-level system control unit, the distancing device comprises a control unit for controlling the individual distancing conveyors.

Good results and a simple design can be achieved, if the functional length of the piece good is detected by a light barrier. The sensor of the control unit is used to determine the respective moment of delivery and the control unit uses the data transmitted from the sensor to the control unit to control the respective speed of the number of the belt conveyors of the distancing device. For the control unit of the distancing device, which is arranged downstream adjacent to the delivery device along the conveying direction, the respective functional length and a moment of delivery of the respective piece good is detected at or upstream of a transfer section of the delivery device.

In a preferred embodiment, the discharge device is a tray conveyor that is essentially operated at a constant circulation speed. Depending on the speed, the work cycle and the individual cycle can be determined by the control unit using the known and fixed tray length and the distance between the conveyor trays. The cycle, in turn, can be used to determine the phase in which the respective piece good should come to rest. In addition, the speed can be used to determine the respective transfer time at which the piece good is to be transferred to the conveyor tray in order to come to rest within the conveyor tray accurate in phase.

Based on the respective functional length and the recorded moment of delivery of the respective piece good, a common speed profile for the number of the distancing conveyors can be created for each piece good by the control unit, so that the respective piece good is transferred to the respective conveyor tray at the transfer section of the distancing conveyor accurate in phase.

Ideally, the piece good that is already on the delivery device already has a delivery cycle that differs from the cycle of the work cycle by a maximum of 20%. Several distancing conveyors can be used to transport piece good with a delivery cycle that differs from the cycle of the work cycle by more than 20%. Typically, the distancing device comprises three to five distancing conveyors. For piece good with a particularly long functional length, the conveying system can also comprise up to seven distancing conveyors. This allows up to 100% deviation from the cycle to be compensated for.

If there are deviations from the cycle of more than 100%, the piece good can no longer be processed by the conveying system. In this case, the piece good usually has to be ejected. Good results can be achieved if the conveying system comprises a discharge device along the conveying direction downstream adjacent to the delivery device. In order to selectively eject individual or several items of piece good from the conveyor device, the conveyor device comprises an ejection device.

A preferred embodiment of the ejection device, the ejection device comprises a first ejection unit and a second ejection unit, which are arranged along the conveying direction between the delivery device and the distancing device. Typically, however, the first and second ejection units are not directly physically coupled, but there is a distance between the delivery device and the first ejection unit and the distancing device and the second ejection unit. If problems occur, the conveying direction of the ejection device can be reversed. In this way, the piece good which has already been transported and delivered to the distancing device can be returned to the discharge device to empty the conveying system and be discharged by the ejection device.

In order to be able to discharge piece good along the conveying direction, the first discharge unit comprises a stationary end arranged adjacent to the delivery device and a movable end arranged downstream of it. The movable end makes it possible to shorten the discharge unit along the conveying direction, whereby a gap can be generated along the conveying direction. Analogous to the first ejection unit, the second ejection unit comprises a movable end arranged downstream adjacent to the first ejection unit and a stationary end arranged downstream thereof adjacent to the distancing device.

The closed state is defined as the state in which the respective movable ends are arranged essentially adjacent to one another. Typically, in the closed state, a distance of 2 mm-50 mm, preferably 5 mm-20 mm, remains between the movable end of the first ejection unit and the movable end of the second ejection unit. The open state is defined as the state in which the two movable ends are moved in the direction of the respective stationary end and are further apart with respect to each other than in the closed state.

In this respect, reference is made to application CH 070371/2021, the content of which is hereby incorporated by reference into the present application Piece good with a delivery cycle which is within the tolerance of up to 20% deviation from the cycle of the work cycle is already transferred from the transfer section of the delivery device to the distancing device accurately in cycle. For larger deviations, the distancing device comprises a plurality of distancing conveyors, which are arranged collinearly along the conveying direction. Typically, these are individual belt conveyors, each of which comprises their own drive and control unit. This allows each of the plurality of distancing conveyors to be driven individually and accelerated or decelerated independently of the adjacent distancing conveyors.

A typical structure of the distancing device comprises three to five distancing conveyors in the form of individually driven belt conveyors. In a preferred embodiment, the individual belt conveyors have a length of 300 mm to 1000 mm, preferably 500 mm or 600. A typical width of the belt conveyors is also 300 mm to 1000 mm. The belt conveyors are usually configured to convey piece good weighing from 0.05 kg to about 25 kg, preferably 0.1 kg to 12 kg.

Good results can be achieved, if the respective piece good is aligned within the cycle by the plurality of distancing conveyors of the distancing device in such a way that it is transferred to the discharge device accurate in phase. If the discharge device is a tray conveyor, the respective piece good is transferred to the corresponding phase within the respective conveyor tray so that it comes to rest within the phase of the respective conveyor tray.

In order to align a piece good transferred from the transfer section of the delivery device to the distancing device within the cycle and bring it into the correct phase position, the speed of each of the distancing conveyors of the plurality of distancing conveyors can be controlled by a transfer section of the distancing device for transferring the piece good accurate in phase.

The delivered piece good usually has a functional length of between 15% and 80% of the cycle length. As a result, short piece good in particular can come to rest off-center in the cycle. The discharge device is usually a tray conveyor with a number of conveyor trays. If a short piece good is arranged off-center in the cycle, this can, in extreme cases, lead to this piece good coming to rest between two conveyor trays during the transfer to the discharge device. In typical applications, the tray conveyor is operated at a speed of 0.5 m/s to 2.5 m/s, preferably at a speed of 0.8 m/s to 1.2 m/s. This is to be understood that around 8000 to 10,000 items of piece good can be conveyed per hour.

Good results for accurate alignment in phase can be achieved if the plurality of distancing conveyors each have a length that essentially corresponds to the length of a cycle. These distancing conveyors are configured to align the piece good, which has already been delivered accurate in cycle, within the cycle so that it is also within the phase specified by the discharge device. In the case of a tray conveyor, this makes it possible for the respective piece good to be transferred at the transfer section of the spacing conveyor to one of the conveyor trays of the plurality of conveyor trays accurate in phase.

The distancing device is also suitable for transporting piece good with a functional length exceeding the length of a distancing conveyor or a conveyor tray. In this case, the accurate alignment of the piece good within the cycle is even more crucial. In the case of a tray conveyor, piece good with a functional length exceeding the length of a conveyor tray does not come to rest within the conveyor tray, but on two conveyor trays. In order to allow piece good with a functional length that exceeds the length of a conveyor tray to come to rest on two consecutive conveyor trays, the piece good can be aligned by the plurality of distancing conveyors of the distancing device in such a way that it comes to rest within two cycles of two consecutive conveyor trays when transferred to two consecutive conveyor trays. In case that the piece good comes to rest in two cycles, the two consecutive conveyor trays define a common phase.

In order to transfer piece good to two consecutive conveyor trays within the two cycles of the two consecutive conveyor trays, at least two adjacent distancing conveyors of the plurality of distancing conveyors are at least temporarily coupled by control technology to form a virtual distancing conveyor.

In this context, temporary is to be understood that only the distancing conveyors on which at least part of the corresponding piece good rests are coupled to form a virtual distancing conveyor. This is to be understood that the virtual distancing conveyor moves along the conveying direction. A virtual belt is then formed by the control unit when the functional length of the piece good exceeds the length of the shorter of the at least two distancing conveyors along the conveying direction.

Alternatively, or in addition, the distancing device can comprise an infeed conveyor. This is usually an additional belt conveyor, which is arranged downstream in the conveying direction, adjacent to the plurality of distancing conveyors.

Good results can be achieved, if the height of the infeed conveyor is adjustable, in particular if it can be pivoted on one side. In a preferred embodiment, the infeed conveyor has the same speed as the downstream discharge device. The height adjustability of the infeed conveyor increases the flexibility of the distancing device and makes it possible to operate various embodiments of discharge devices.

As already explained above, piece good that is already on the delivery device and has a delivery cycle that differs from the work cycle by more than 20% cannot be processed. In order to avoid such large deviations, the conveying system can comprise at least one feed device in a preferred embodiment. Piece good can be transferred to the delivery device discontinuously by the at least one delivery device in such a way that the respective piece good is transferred to the delivery device within a delivery cycle and comes to rest on the delivery device.

Since the delivery device is usually a belt conveyor and a plurality of piece goods are on the delivery device at the same time, it usually has to be ensured that the piece good is already on the delivery device within a delivery cycle that is within the tolerance of 20% of the cycle of the work cycle. To ensure this, the feeding device can be a belt conveyor that is cyclically accelerated and decelerated, whereby the piece good is provided on the feeding device when the belt conveyor is decelerated.

The cyclical speed profile can be used to generate a uniform distance between the piece good and a leading and/or trailing piece good on the feeding device. In addition to the orderly feeding of the piece good onto the delivery device, the decisive step is the accurate in cycle transfer of the piece good to the delivery device.

Good results can be achieved if the belt conveyor is operated in a stop and go mode, whereby the piece good is placed on the feeding device while the belt conveyor is at a standstill. A typical procedure is to manually or mechanically place the piece good at feeding stations. In order to ensure that the piece good is not only pre-positioned but also accurately aligned on the feeding device, this can comprise templates in the area of the feeding stations.

Good results can be achieved if the piece good is pre-positioned on the feeding device using a template. Depending on the size and design of the feeding stations, as well as the design of the conveying system, the templates can be either physical templates or visual templates. In a preferred embodiment, the template can be a physical template in the form of a stop and/or a frame. Physical stencils are particularly suitable for stop and go operations due to their simple design. Alternatively, or additionally, the stencil can be an optical stencil in the form of a light grid and/or a laser grid. The advantage of optical stencils over physical stencils is that they can also be moved along with the belt movement.

The feeding device can have a plurality of belt conveyors, whereby only piece good of a certain size category and/or product category is provided on each of the plurality of belt conveyors. Depending on the use of the conveying system, in addition to loading the discharge device as completely as possible, loading should also be achieved in a predefined sequence. If a predefined product sequence is to be achieved, this is achieved by alternately loading the delivery device.

The control unit is used to control a predefined pattern of the multiple belt conveyors of the feeding device in such a way that the respective piece good is transferred to the feeding device in the intended cycle. In this way, a pattern of piece good of different size categories and/or product categories can be achieved by the alternating transfer of piece good to the delivery device. In a preferred embodiment, the plurality of belt conveyors of the feeding device is arranged at an angle with respect to the conveying direction. Preferably, the belt conveyors of the plurality of belt conveyors of the feeding device are arranged at an angle of 30° to 60°. However, the belt conveyors can also be arranged at right angles and offset from one another along the conveying direction adjacent to the delivery device.

In a further embodiment of the conveying system, the transfer of the respective piece good accurate in phase can be controlled by determining the dimensions of the respective piece good by a sensor. A control unit can be used to form a virtual rectangle based on the dimensions determined. A separate virtual rectangle is formed for each piece good. The virtual rectangle includes the outline of the respective piece good. Based on the position of a virtual center point of the virtual rectangle on the delivery device, the distancing device can be controlled in such a way that the respective piece good can be transferred at the transfer section accurate in phase.

The conveying system can therefore be configured to enable the transfer of piece good to a discharge device accurate in phase. In order to be able to eject at least one item of piece good from the conveying system before the discharge device, the conveying system can comprise at least one ejection device as described above.

Depending on how the conveying system is used, the discharge device can be loaded in a predefined sequence in addition to being loaded as seamlessly as possible. The discharge device can be arranged along a longitudinal axis and determines the speed and cycle of the entire conveying system. The discharge device is preferably the master of the conveying system. The piece good can be delivered by a delivery device along a conveying direction of the delivery device. The conveying direction of the delivery device can be aligned parallel or at an angle to the longitudinal axis of the discharge device. The arrangement can be made according to the structural conditions at the installation site.

By a first sensor and a control unit, an outline and/or a virtual length and a virtual width as well as a moment of delivery of the respective piece good at the transfer section of the delivery device or upstream of the transfer section of the delivery device can be determined. The dimensions of the respective piece good can be recorded from above or in a top view. The virtual length is preferably recorded parallel to the longitudinal axis of the discharge device and the virtual width perpendicular to the longitudinal axis of the discharge device. An optical sensor can be used to detect the outline of the respective piece good and/or the functional length and functional width of the respective piece good. The optical sensor can take the form of a light grid or laser raster. If the optical sensor is not aligned parallel to the longitudinal axis of the discharge device on the delivery device, the functional length detected along the conveying direction of the delivery device can be converted into the virtual length and a functional width detected perpendicular to the functional length can be converted into the virtual width. This conversion can be carried out by the control unit, for example by a coordinate transformation.

Based on the calculated virtual length and virtual width, a virtual layout of the respective piece good can be calculated in the form of a virtual rectangle, which is minimized to the virtual length and virtual width. The virtual rectangle is approximated to the piece good in such a way that the respective piece good is completely enclosed by the virtual rectangle, preferably approximated in such a way that it is just barely enclosed. Approximating piece good of any shape to a virtual rectangle minimizes the control effort and the amount of data to be transmitted.

The respective piece good can already be transferred from the transfer section of the delivery device to the distancing device accurately in cycle. The distancing device may comprise a plurality of distancing conveyors arranged in succession along a conveying direction of the distancing device. The speed of each of the distancing conveyors of the plurality of distancing conveyors can be individually controlled by the control unit for transferring the piece good from a transfer section of the distancing device to the discharge device accurate in phase. In order to change the position of the respective piece good along the conveying direction of the distancing device with respect to the assigned delivery place, the speed of the distancing conveyors can be dynamically controlled, i.e. accelerated or decelerated.

In order to be able to transfer the respective piece good in an aligned manner, it can already be placed on the delivery device parallel to the longitudinal direction of the discharge device. Therefore, the respective virtual rectangle is also preferably aligned by the control system in such a way that it is aligned parallel to the longitudinal direction of the discharge device, regardless of the actual alignment of the respective piece good on the delivery device. On the one hand, the already aligned transfer reduces the control effort, and on the other hand, it can be avoided that piece good is placed in such an aligned position that it protrudes laterally along the longitudinal axis of the discharge device when it is transferred to the delivery place.

In order to further minimize the control effort, the virtual center point of the respective virtual rectangle can be calculated and, based on the moment of delivery and the position of the virtual center point on the delivery device, the speed of each of the plurality of distancing conveyors can be controlled in such a way that the respective piece good is transferred to the discharge device in phase at the transfer section of the distancing device. The plurality of distancing conveyors can be controlled by the control unit in such a way that the virtual center point is transferred to the assigned delivery place of the discharge device in such an accurate manner within the phase that the virtual center point and thus the respective piece good itself comes to rest essentially centrally with respect to the longitudinal axis of the discharge device on the assigned delivery place.

In order to prevent already occupied delivery places from being occupied twice, the discharge device, upstream of the transfer section of the distancing device, can be monitored by a second sensor and a respective piece good already lying on the delivery device can be assigned to an unoccupied delivery place, preferably in the form of a conveyor tray, by the control unit. If several successive delivery places are already occupied, the delivery device and/or the distancing conveyors of the distancing device can be operated in stop-and-go mode in such a way that the piece good is transferred to an unoccupied delivery place on the discharge device in each case.

If, based on the sensor data of the first sensor, it is determined that the virtual length is less than the length of a delivery place, the speed of the distancing conveyors can be controlled in such a way that the speed profile of the respective piece good is selected in such a way that the virtual center point is essentially centered on the assigned delivery place during accurate-in-phase transfer. If the virtual length exceeds the length of a delivery place, the speed of the virtual distancing conveyors can be controlled in such a way that the virtual center point comes to rest essentially centrally between two successive delivery places, preferably on two successive conveyor trays, during transfer accurate in phase.

The individual, preferably dynamic, control unit of the distancing conveyors can ensure that the respective piece good is aligned within the cycle in such a way that it comes to rest within the phase of the delivery place when it is transferred to the delivery place. The distancing conveyors of the distancing device can be controlled individually so that the speed profile of the respective piece good corresponds to a polynomial equation of a higher order, preferably fifth order.

At least two adjacent distancing conveyors of the plurality of distancing conveyors can be at least temporarily coupled by the control system to form a virtual distancing conveyor if the functional length of the piece good exceeds the length of one of the at least two distancing conveyors along the conveying direction.

Depending on the design of the conveying system, several distancing devices can load a discharge device. These can also be fed to the discharge device at different angles and/or at different levels. With several distancing devices, the piece good can be placed on the respective delivery device in such a way that it is already aligned on the delivery device and the distancing devices parallel to the longitudinal axis of the discharge device. The plurality of belt conveyors of the delivery device and/or the plurality of belt conveyors of the distancing devices can be angled with respect to the longitudinal direction of the discharge device and/or arranged adjacent to each other with an offset.

Alternatively, or additionally, the delivery device may have a plurality of belt conveyors, with only piece good of a certain size category and/or product category being provided on each of the plurality of belt conveyors, so that a pattern of piece good of different size categories and/or product categories is achieved by alternately transferring piece good to the delivery device. The discharge device can be a tray conveyor with a plurality of conveyor trays, with each tray corresponding to a delivery place.

In order to be able to transfer the respective piece good to the discharge device accurate in phase, the conveying system comprises a control unit. The control unit can be configured to receive geometrical information from a first sensor. The first sensor is configured to detect geometrical information of the respective piece good, preferably on the delivery device. The first sensor may detect an outline of the respective piece good and/or the functional length and the functional width and/or a moment of delivery of the respective piece good, at or upstream of a transfer section of the delivery device.

In order to prevent piece good from being transferred to a delivery place of the discharge device that is already occupied, the control unit is additionally configured to receive occupancy data in order to determine unoccupied delivery places, preferably in the form of trays, on the discharge device upstream of a transfer section of the distancing device. Alternatively, the occupancy data can also be received by another control unit, which calculates a virtual occupancy plan for the discharge device. In order to enable accurate transfer of the respective piece good accurate in phase, the control unit is preferably configured to transfer control signals to each of the plurality of distancing conveyors of the distancing device in order to control their speed individually.

Based on the Geometrical information, the control unit can calculate the virtual layout of the respective piece good in the form of a virtual rectangle, which is minimized to the virtual length and virtual width. The size of the virtual rectangle is determined in such a way that the respective piece good is completely enclosed by the virtual rectangle. Based on the virtual rectangle and the moment of delivery, the control unit can control each of the plurality of distancing conveyors by the control signals in such a way that the respective piece good is transferred to the discharge device accurate in phase.

In order to be able to transfer piece good to the center of a delivery place, the control unit is preferably configured to always align the virtual rectangle so that it is aligned parallel to the longitudinal direction of the discharge device, regardless of the actual alignment of the respective piece good. In order to prevent a delivery place on the discharge device from being occupied twice, the control unit can be configured to receive the occupancy data from a second sensor, which detects unoccupied delivery places upstream of a transfer section of the distancing device. Alternatively, an occupancy plan of the discharge device can be used to monitor which delivery places are already occupied.

In order to reduce the computing effort and the amount of data to be transmitted, the control unit can be configured to calculate a virtual center point of the virtual rectangle and, based on the moment of delivery and the virtual center point, to calculate the position of the respective piece good on the delivery device and thereby dynamically control the speed of each of the plurality of distancing conveyors in such a way that the respective piece good is transferred to the discharge device in at the transfer section of the distancing device accurate in phase.

The control unit can be configured to control the speed of each of the plurality of distancing conveyors in such a way that the virtual center point is transferred to the assigned delivery place of the discharge device accurate in phase, so that the virtual center point and thus the respective piece good comes to rest essentially centrally with respect to the longitudinal axis of the discharge device on the assigned delivery place.

The control unit can be configured to assign a respective item of piece good to an unoccupied delivery place, preferably a conveyor tray, on the discharge device already on the delivery device based on the occupancy data of the second sensor. For this purpose, the control unit can operate the delivery device and/or the distancing conveyors in stop-and-go mode in order to transfer the respective piece good to the assigned unoccupied delivery place on the discharge device.

Based on the Geometrical information, the control unit can calculate whether the virtual length falls below or exceeds the length of a delivery place. If the virtual length is less than the length of a delivery place, the respective piece good can be transferred to the assigned delivery place along the longitudinal axis of the discharge device essentially in the center. If the virtual length exceeds the length of a delivery place, the respective piece good can be transferred along the longitudinal axis of the discharge device essentially centrally between two successive delivery places, preferably to two successive conveyor trays.

BRIEF DESCRIPTION OF SEVERAL VIEWS OF THE DRAWINGS

Aspects of the disclosure are explained in more detail with reference to the embodiments shown in the following figures and the associated descriptions.

FIG. 3 shows a schematic view of an embodiment of a delivery device and a distancing device;

FIG. 4a shows a schematic view of an embodiment of the feeding device for the conveying system;

FIG. 4b shows a schematic view of a second embodiment of the feeding device for the conveying system;

FIG. 4c shows a schematic view of a third embodiment of the feeding device for the conveying system;

DETAILED DESCRIPTION OF THE INVENTION

Figure 1:
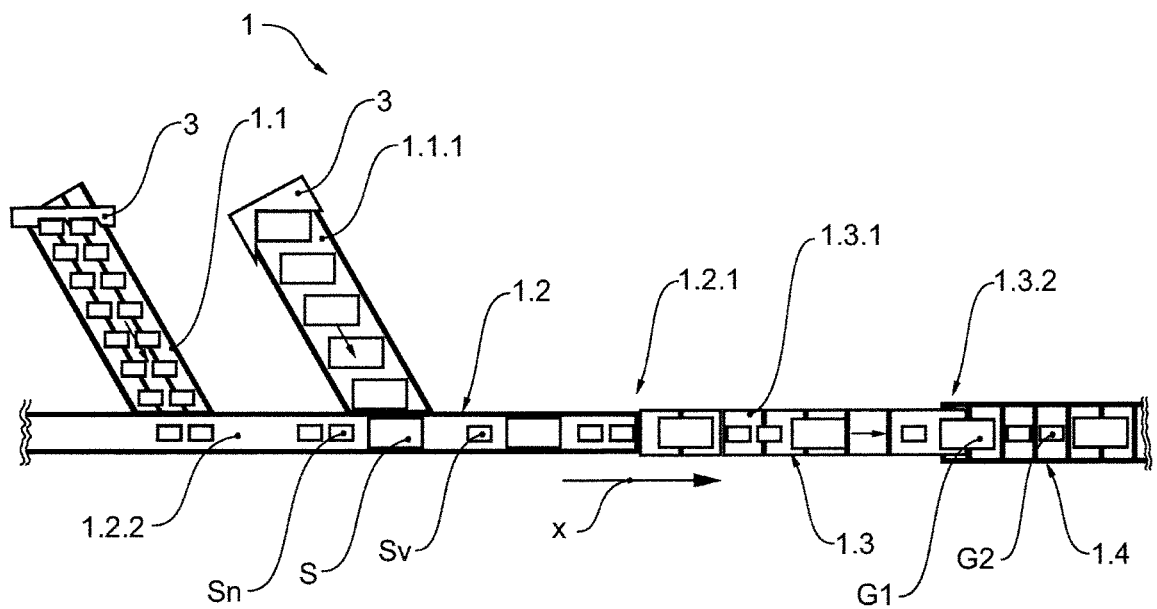
FIG. 1 shows a schematic view of an embodiment of the conveying system.

FIG. 1 shows the transfer of piece good S, $S_v$, $S_n$ to a discharge device 1.4 accurately in phase. The schematic view shows an embodiment of the conveying system 1. The piece good S, $S_v$, $S_n$, in the form of packages, is provided on a feeding device 1.1. The shown embodiment of the feeding device 1.1 comprises a plurality of belt conveyors 1.1.1, wherein only piece good S, $S_v$, $S_n$ of a certain size category $G_1$, $G_2$ is provided on each of the plurality of belt conveyors 1.1.1. Depending on the application of the conveying system 1, in addition to loading the discharge device 1.4 as completely as possible, loading should also be achieved in a predefined sequence.

In the embodiment shown, two smaller items of piece good $G_2$ and one larger item of piece good $G_1$ are fed alternately, preferably alternately. In this case, a predefined product sequence is achieved by alternately loading the delivery device 1.2. For this purpose, the plurality of belt conveyors 1.1.1 of the delivery device 1.1 is controlled by the control unit 2 in a predefined pattern in such a way that the respective piece good S, $S_v$, $S_n$ is transferred to the delivery cycle $A_t$ on the delivery device 1.2 provided for this purpose.

By alternately transferring piece good S, $S_v$, $S_n$ to the delivery device 1.2, a pattern of piece good S, $S_v$, $S_n$ of different size categories $G_1$, $G_2$ is achieved. In the embodiment shown, the plurality of belt conveyors 1.1.1 of the delivery device 1.1 are arranged in a herringbone pattern and offset from one another along the conveying direction x adjacent to the delivery device 1.2.

Figure 2:
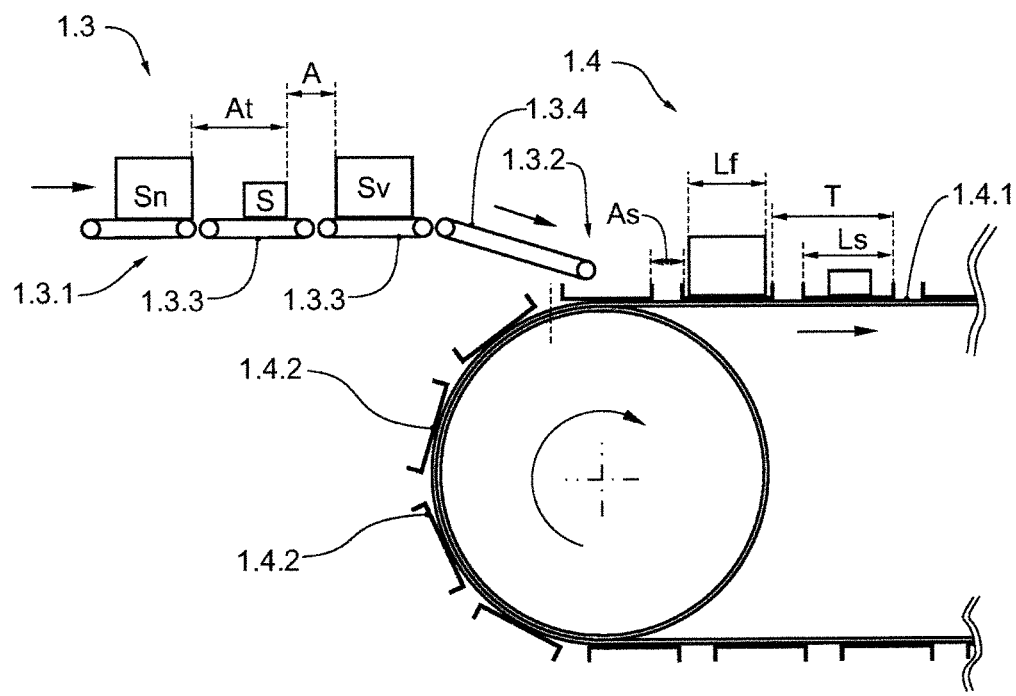
FIG. 2 shows a schematic view of an embodiment of a distancing device and a discharge device.

FIG. 2 shows an embodiment of the distancing device 1.3 with three distancing conveyors 1.3.1 in the form of individually driven belt conveyors 1.3.3, as well as an infeed belt 1.3.4 arranged downstream and adjacent thereto in the conveying direction. Typically, the individual belt conveyors 1.3.3 have a length along the conveying direction x of 300 mm to 1000 mm, preferably 500 mm or 600 mm. A typical width, perpendicular to the conveying direction x, of the belt conveyors 1.3.3 is also 300 mm to 1000 mm. The belt conveyors 1.3.3 are configured to convey piece good S, $S_v$, $S_n$ with a weight of 0.05 kg to about 25 kg, preferably 0.1 kg to 12 kg.

The discharge device 1.4 shown is a tray conveyor 1.4.1 with a plurality of conveyor trays 1.4.2. If a short piece good S, $S_v$, $S_n$ lies off-center in the cycle T, this can, in extreme cases, lead to this piece good S, $S_v$, $S_n$ coming to rest between two conveyor trays 1.4.2 during the actual transfer to the discharge device 1.4, as described above. In typical applications, the tray conveyor 1.4.1 is operated at a speed of 0.5 m/s to 2.5 m/s, preferably at a speed of 0.8 m/s to 1.2 m/s. This is to be understood that around 8000 to 10000 items of piece good S, $S_v$, $S_n$ can be conveyed or processed per hour.

The infeed conveyor 1.3.4 shown is usually an additional belt conveyor 1.3.3, which is arranged downstream in the conveying direction x, adjacent to the plurality of distancing conveyors 1.3.1. The shown infeed conveyor 1.3.4 is height-adjustable and typically has an essentially identical speed as the downstream discharge device 1.4. The height adjustability of the infeed conveyor 1.3.4 increases the flexibility of the distancing device 1.3 and makes it possible to operate various versions of discharge devices 1.4.

In the embodiment shown, piece good S, $S_v$, $S_n$, is transferred from the transfer section 1.2.1 of the delivery device 1.2 to the distancing device 1.3 by the infeed conveyor 1.3.4. The shown distancing conveyors 1.3.1 are arranged collinear to each other along the conveying direction x.

In the embodiment shown, these are individual belt conveyors 1.3.3, each of which comprises its own drive and control unit. This allows for each of the plurality of distancing conveyors 1.3.1 to be driven individually and accelerated or decelerated independently of the adjacent distancing conveyors 1.3.1. By each of the belt conveyors 1.3.3 shown, a deviation of the delivery cycle A from the cycle T of the work cycle of up to 20% can be corrected.

In the embodiment shown, the cycle T of the work cycle is set by the tray conveyor 1.4.1 as the clocking device. In the embodiment shown, the tray conveyor 1.4.1 typically represents the cycle generator for the entire conveying system 1 due to its inertia and continuous conveying and therefore defines the work cycle for the entire conveying system 1. In the embodiment shown, the cycle T is to be understood as the length $L_S$ of a conveyor tray 1.4.2 along the conveying direction x plus the distance $A_S$ between the conveyor tray 1.4.2 and the following conveyor tray 1.4.2 along the conveying direction x.

The delivery cycle $A_t$, on the other hand, is to be understood as the cycle of the delivered piece good S, $S_v$, $S_n$. In the embodiment shown, the delivery cycle $A_t$ corresponds to the functional length $L_f$ of a piece good S, $S_v$, $S_n$ along the conveying direction x plus the distance A of the piece good S, $S_v$, $S_n$ to the following piece good S, $S_v$, $S_n$ along the conveying direction x. Ideally, the delivery cycle $A_t$ already corresponds to the cycle T of the work cycle. However, this is not always possible due to the different sizes $G_1$, $G_2$ and the dimensions of the delivered piece good S, $S_v$, $S_n$, as well as an economical process control, as provision accurate in cycle would lead to too much control effort.

To correct the deviation of the delivery cycle $A_t$ from the cycle T by a maximum of 20%, the shown piece good S, $S_v$, $S_n$ is aligned within the cycle T by the plurality of distancing conveyors 1.3.1 of the distancing device 1.3 in such a way that it comes to rest within the phase of the respective conveyor tray 1.4.2 when it is transferred to the respective conveyor tray 1.4.2. In order to now align a piece good S, $S_v$, $S_n$ transferred from the transfer section 1.2.1 of the delivery device 1.2 to the distancing device 1.3 within the cycle T and bring it into the correct phase position, the speed of each of the distancing conveyors 1.3.1 of the plurality of distancing conveyors 1.3.1 for transferring the piece good S, $S_v$, $S_n$ accurate in phase can be controlled by a transfer section 1.3.2 of the distancing device 1.3.

The delivered piece good S, $S_v$, $S_n$ usually has a functional length $L_f$ of essentially 15% to 70% of the cycle length of cycle T. $A_S$ a result, short piece good S, $S_v$, $S_n$ in particular can come to rest off-center in the cycle T. The discharge device 1.4 is usually a tray conveyor 1.4.1 with a plurality of conveyor trays 1.4.2. If a short piece good S, $S_v$, $S_n$ is arranged off-center in cycle T, this can, in extreme cases, lead to this piece good S, $S_v$, $S_n$ coming to rest between two conveyor trays during the actual transfer to the discharge device 1.4, as described above.

In typical applications, the tray conveyor 1.4.1 is operated at a speed of 0.5 m/s to 2.5 m/s, preferably at a speed of 0.8 m/s to 1.2 m/s. This is to be understood that around 8000 to 10000 items of piece good can be conveyed or processed per hour.

In order to avoid inaccurate transfer, the distancing device 1.3 comprises, in a preferred embodiment, a plurality of distancing conveyors 1.3.1 in the form of individually driven belt conveyors 1.3.3 for transferring the respective piece good S, $S_v$, $S_n$ from the transfer section of the distancing conveyor 1.3.1 to a discharge device 1.4 accurate in phase. Good results for aligning accurate in phase can be achieved, if the plurality of distancing conveyors 1.3.1 comprises 3 to 5 distancing conveyors 1.3.1, each of which has a length that essentially corresponds to the length of a cycle T. These are configured to align the piece good S, $S_v$, $S_n$, which has already been delivered accurate in cycle, within the cycle T so that it is also within the phase specified by the discharge device 1.4.

In the case of a tray conveyor 1.4.1, it is possible for the respective piece good S, $S_v$, $S_n$ to be transferred at the transfer section of the spacing conveyor 1.3.1 by the infeed conveyor 1.3.4 to one of the conveyor trays of the plurality of conveyor trays accurate in phase.

FIG. 3 shows an embodiment of the conveying system 1 with a delivery device 1.2 that can be accelerated or decelerated. Thus, when varying the speed of the downstream steps, usually the discharge device 1.4, the speed of the delivery device 1.2 can be adjusted to its speed in order to ensure that the delivery cycle $A_t$ does not deviate by more than 20% from the cycle T within the work cycle.

The conveying system 1 shown comprises a control unit 2 with a sensor 2.1 for detecting a respective functional length $L_f$ and a moment of delivery $t_1$ of the respective piece good S, $S_v$, $S_n$. Since delivery accurate in cycle is not sufficient to ensure that the piece good S, $S_v$, $S_n$ can actually be transferred to the downstream discharge device 1.4 in an accurate position, FIG. 3 schematically shows how the transfer is also achieved by the distancing device 1.3 accurate in phase.

The piece good S, $S_v$, $S_n$ is delivered along the conveying direction x by the delivery device 1.2 shown. The delivery device 1.2 shown is a belt conveyor 1.2.2. In a preferred embodiment, a sensor 2.1 is arranged upstream or in the area of the transfer section 1.2.1 of the delivery device 1.2 and is communicatively connected to a control unit 2.

By a sensor 2.1 of the control unit 2, the respective moment of delivery $T_1$ is determined and by data transmitted from the sensor 2.1 to the control unit 2, the control unit 2 controls the respective speed of the plurality of belt conveyors 1.3.3 of the distancing device 1.3.

For the control unit 2 of the distancing device 1.3, which is arranged adjacent to the delivery device 1.2 downstream along the conveying direction, the respective functional length $L_f$ and a moment of delivery of the respective piece good S, $S_v$, $S_n$ at or upstream of a transfer section of the delivery device 1.2 are detected.

The functional length $L_f$ of a piece good S, S, $S_{vn}$ is to be understood here as the length of the piece good S, $S_v$, $S_n$, along the conveying direction. If, for example, a piece good S, $S_v$, $S_n$, in the embodiment shown a square or rectangular package lies diagonally on the delivery device 1.2, the functional length $L_f$ corresponds to the diagonal length of the package measured along a straight line parallel to the conveying direction. Based on the respective functional length $L_f$ and the detected moment of delivery of the respective piece good S, $S_v$, $S_n$, a common speed profile can be created for each piece good S, $S_v$, $S_n$ for the plurality of distancing conveyors 1.3.1 by a control unit 2, so that the respective piece good S, $S_v$, $S_n$ is transferred to the respective conveyor axis at the transfer section of the distancing conveyor 1.3.1 accurate in phase.

As already defined above, a cycle T within the work cycle in the case of a tray conveyor 1.4.1 as a cycle generator is defined as the length $L_S$ of a conveyor tray 1.4.2 along the conveying direction x plus the distance $A_S$ of the conveyor tray 1.4.2 to the following conveyor tray 1.4.2 along the conveying direction x. In extreme cases, a piece good S, $S_v$, $S_n$ with a very small functional length $L_f$, although it is delivered within the cycle T and thus accurate in cycle, may not come to rest within the intended conveyor tray 1.4.2 when it is transferred to the discharge device 1.4, but at the distance $A_S$ of the conveyor tray 1.4.2 to the following conveyor tray 1.4.2, i.e. between two conveyor trays 1.4.2.

As already stated above noted, piece good S, $S_v$, $S_n$ of different sizes $G_1$, $G_2$ is usually conveyed. In order to adjust the conveying system x to the respective piece good S, $S_v$, $S_n$, the respective functional length $L_f$ and the moment of delivery $t_1$ of the respective piece good S, $S_v$, $S_n$ are determined by the control unit 2 with the sensor 2.1. The functional length $L_f$ of the respective piece good S, $S_v$, $S_n$ is to be understood here as the length of the piece good S, $S_v$, $S_n$ along the conveying direction x. If, for example, a square or rectangular piece good S, $S_v$, $S_n$ lies diagonally on the delivery device 1.2, the functional length Le corresponds to the diagonal of the piece good S, $S_v$, $S_n$ measured along a straight line parallel to the conveying direction x.

The distancing device 1.3 is also suitable for transporting piece good S, $S_v$, $S_n$ with a functional length that $L_f$ exceeds the length of a distancing conveyor 1.3.1 or a conveyor tray. In this case, the accurate alignment of the piece good S, $S_v$, $S_n$ within the cycle T is even more crucial.

In the case of a tray conveyor 1.4.1, a piece good S, S, $S_{vn}$ with a functional length $L_f$ that exceeds the length $L_S$ of a conveyor tray does not come to rest within the conveyor tray, but on two conveyor trays. In order to enable piece good S, $S_v$, $S_n$ with a functional length $L_f$ which exceeds the length $L_S$ of a conveyor tray to come to rest on two consecutive conveyor trays, the piece good S, $S_v$, $S_n$ can be aligned by the plurality of distancing conveyors 1.3.1 of the distancing device 1.3 in such a way that it comes to rest within the two phases of the two consecutive conveyor trays during transfer to two consecutive conveyor trays.

For this purpose, at least two adjacent distancing conveyors 1.3.1 of the plurality of distancing conveyors 1.3.1 can be at least temporarily coupled by the control system to form a virtual distancing conveyor 1.3.1 if the functional length $L_f$ of the piece good S, $S_v$, $S_n$ exceeds the length of the shorter of the at least two distancing conveyors 1.3.1 along the conveying direction.

In order to transfer piece good S, $S_v$, $S_n$ to two consecutive conveyor trays 1.4.2 in a secure position, the consecutive conveyor trays 1.4.2 form a double cycle and a common phase. To transfer the piece good S, $S_v$, $S_n$ in a double cycle, two adjacent distancing conveyors 1.3.1 of the plurality of distancing conveyors 1.3.1 are at least temporarily coupled by the control system to form a virtual distancing conveyor 1.3.1. In this context, temporary is to be understood that only those distancing conveyors 1.3.1 on which at least part of the corresponding piece good S, $S_v$, $S_n$ rests are coupled to form a virtual distancing conveyor 1.3.1.

This is to be understood that the virtual distancing conveyor 1.3.1 moves along the conveying direction. A virtual belt is formed by the control unit 2 when the functional length of the piece good S, $S_v$, $S_n$ exceeds the length of the shorter of the at least two distancing conveyors 1.3.1 along the conveying direction.

FIGS. 4a to 4c show embodiments of the feeding device 1.1, whereby the piece good S, $S_v$, $S_n$ is pre-positioned on the feeding device 1.1 by templates 3. Depending on the size and design of the feeding stations, as well as the design of the conveying system 1, the templates 3 can be either physical templates or visual templates. In the embodiment shown in FIG. 4a, the template 3 is a physical template in the form of a stop 3.1 and/or a frame. Physical templates 3 are particularly suitable for stop and go operation due to their simple design. In the embodiment shown in FIG. 4b, the stencil 3 is an optical stencil in the form of a light grid 3.2. This is projected onto the feeding device 1.1. Alternatively, the template 3 can also be a laser grid 3.3 as shown in FIG. 4c. The advantage of optical templates 3 is that they can be guided along with the movement of the conveyor belt.

Figure 5:
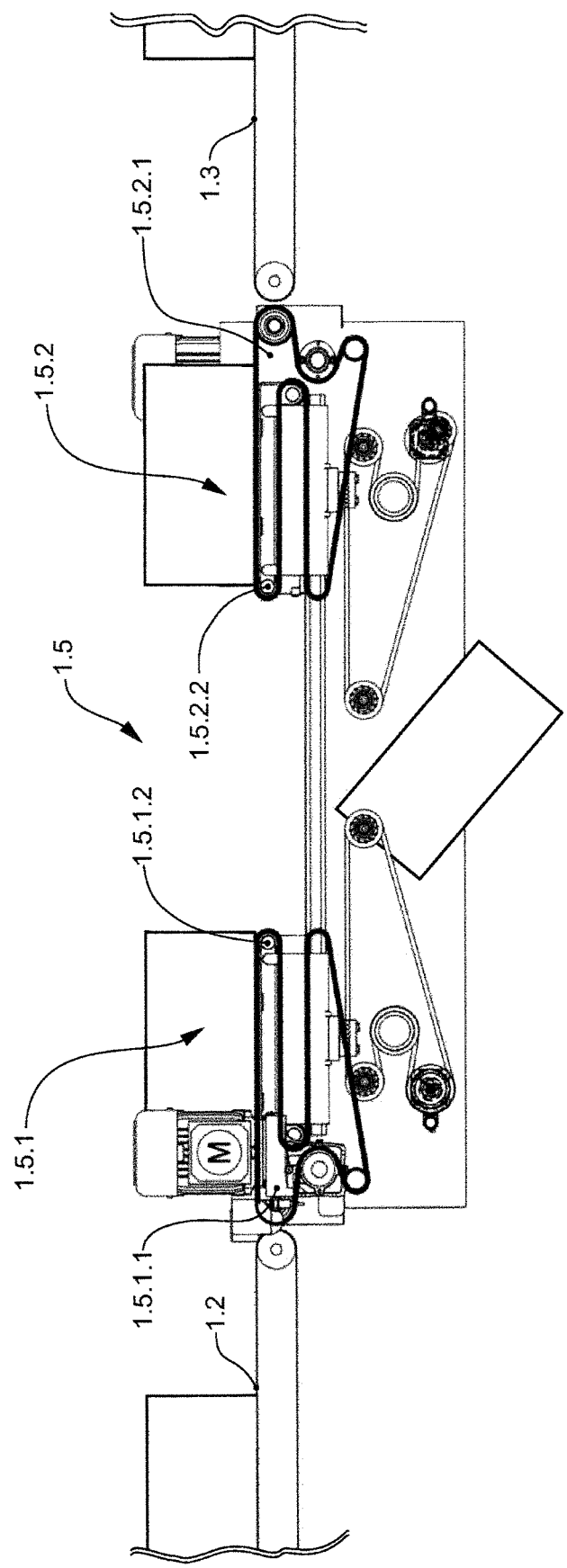
FIG. 5 shows a schematic view of an embodiment of a discharge device for the conveying system.

FIG. 5 shows an embodiment of the conveying system 1 comprising a discharge device 1.5. The ejection device 1.5 shown comprises a first 1.5.1 and a second 1.5.2 ejection unit, which are arranged along the conveying direction x between the delivery device 1.2 and the distancing device 1.3. Usually, however, the first 1.5.1 and a second 1.5.2 ejection unit are not directly physically coupled, but there is a distance between the delivery device 1.2 and the ejection device 1.5, as well as between the ejection device 1.5 and the distancing device 1.3. If problems occur, the conveying direction x of the ejection device 1.5 can be reversed. In this way, the piece good S, $S_v$, $S_n$ already located on the distancing device 1.3 can be returned to the ejection device 1.5 and ejected by this device.

In order to be able to eject piece good S, $S_v$, $S_n$ along the conveying direction x, the first ejection unit 1.5.1 comprises a stationary end 1.5.1.1 arranged adjacent to the delivery device 1.2 and a movable end 1.5.1.2 arranged downstream of it. The movable end 1.5.1.2 enables the ejection unit 1.5 to be shortened along the conveying direction x, whereby a gap can be generated along the conveying direction x. Analogous to the first ejection unit 1.5.1, the second ejection unit 1.5.2 comprises a movable end 1.5.2.2 arranged downstream adjacent to the first ejection unit 1.5.1 and a stationary end 1.5.2.1 arranged downstream thereof adjacent to the distancing device 1.3.

The closed state is defined as the state in which the respective movable ends 1.5.1.2, 1.5.2.2 are arranged substantially adjacent to each other. Typically, in the closed state, a distance of 2 mm-50 mm, preferably 5 mm-20 mm, remains between the movable end 1.5.1.2 of the first ejection unit 1.5.1 and the movable end 1.5.2.2 of the second ejection unit 1.5.2. Conversely, the open state is defined as the state in which the two movable ends 1.5.1.2, 1.5.2.2 are moved in the direction of the respective stationary end 1.5.1.1, 1.5.2.1 and are further apart with respect to each other than in the closed state.

Figure 6:
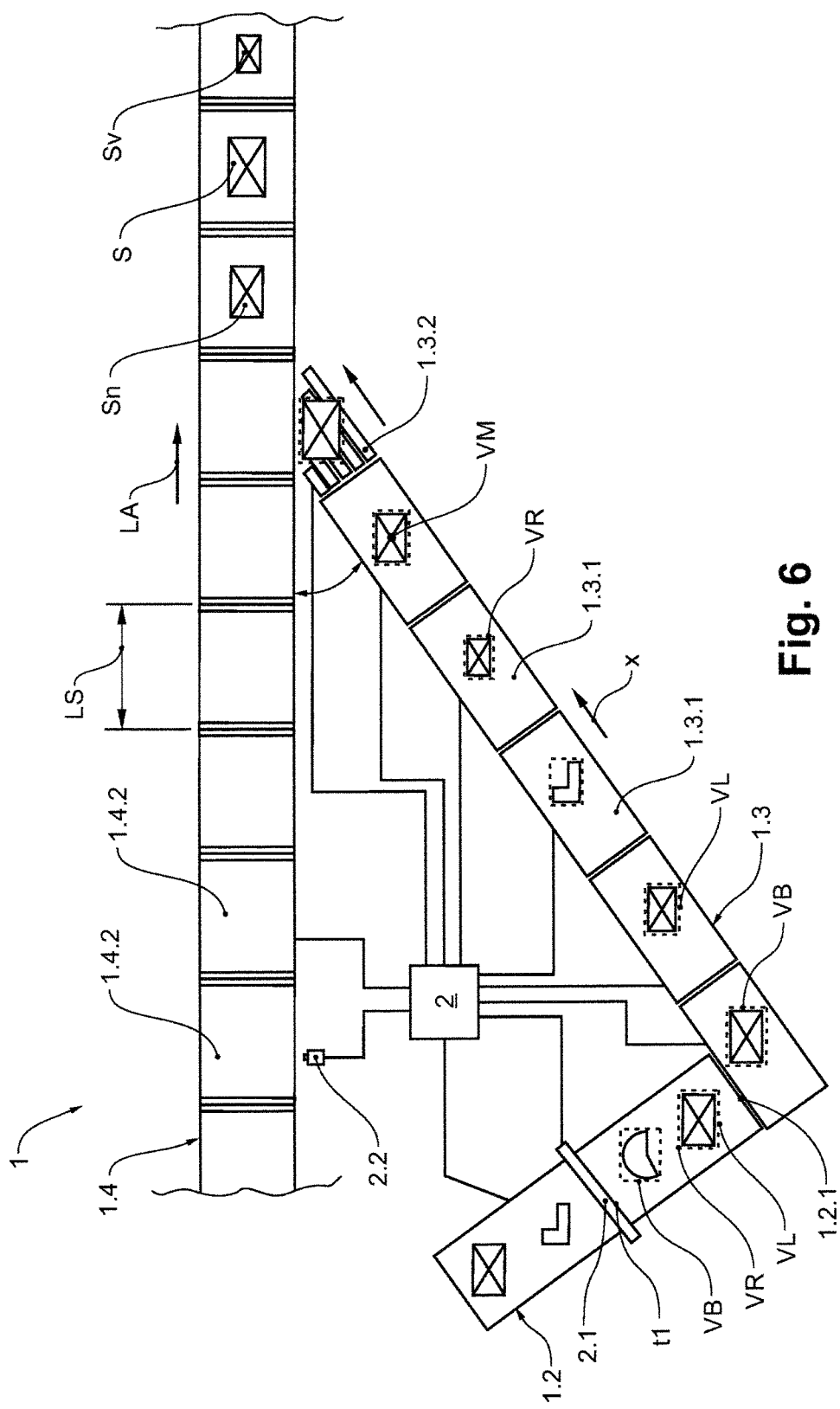
FIG. 6 shows a schematic view of another embodiment of the conveying system.

FIG. 6 shows a schematic representation of a further embodiment of the conveying system 1. The conveying system 1 is configured to enable the transfer of piece good S, $S_v$, $S_n$ to a discharge device 1.4 accurate in phase. In the schematic representation of the conveying system 1 shown, the piece good S, $S_v$, $S_n$ in the form of packages, is provided on a delivery device 1.2.

Depending on the use of the conveying system 1, in addition to loading the discharge device 1.4 as completely as possible, loading should also be achieved in a predefined sequence. The discharge device 1.4 shown is arranged along a longitudinal axis $L_A$ and determines the speed and the cycle of the conveying system 1. The piece good S, $S_v$, $S_n$ is conveyed by the delivery device 1.2 along a conveying direction x of the delivery device 1.2. The delivery device 1.2 and/or the distancing device 1.3 can be arranged parallel or, as in the embodiment shown, at an angle to the longitudinal axis $L_A$ of the discharge device 1.4.

Geometrical information D of the respective piece good S, $S_v$, $S_n$ is recorded by a first sensor 2.1 in order to be able to determine a virtual length $V_L$ and a virtual width VB as well as a moment of delivery $t_1$ of the respective piece good S, $S_v$, $S_n$ by the control unit 2. As shown in FIG. 6, the geometrical information D of the respective piece good S, $S_v$, $S_n$ is recorded upstream of the transfer section 1.2.1 of the delivery device 1.2. The virtual length $V_L$ is recorded parallel to the longitudinal axis $L_A$ of the discharge device 1.4 and the virtual width $V_B$ is recorded perpendicular to the longitudinal axis $L_A$ of the discharge device 1.4. If the first sensor 2.1, as in the embodiment shown in the form of an optical sensor, for example in the form of a light grid, is not arranged parallel to the longitudinal axis $L_A$ of the discharge device 1.4, the functional length $L_f$ detected along the conveying direction x of the delivery device 1.2 is converted into the virtual length $V_L$ and a functional width Bf detected perpendicular thereto is converted into the virtual width $V_B$, for example by a coordinate transformation.

Based on the recorded virtual length $V_L$ and the virtual width $V_B$ a virtual layout of the respective piece good S, $S_v$, $S_n$ is calculated in the form of a virtual rectangle $V_R$, which is minimized to the virtual length $V_L$ and the virtual width $V_B$. The virtual rectangle $V_R$ is approximated to the respective piece good so that the piece good S, $S_v$, $S_n$ is completely enclosed by the virtual rectangle $V_R$, preferably approximated in such a way that it is just barely enclosed.

The respective piece good S, $S_v$, $S_n$ is already transferred in a clocked manner from the transfer section 1.2.1 of the delivery device 1.2 to the distancing device 1.3, which comprises a plurality of distancing conveyors 1.3.1, which are arranged in succession along a conveying direction $x_1$ of the distancing device 1.3. The speed of each of the distancing conveyors 1.3.1 of the plurality of distancing conveyors 1.3.1 is controlled by the control unit 2 in order to transfer the respective piece good S, $S_v$, $S_n$ from a transfer section 1.3.2 of the distancing device 1.3 to the discharge device 1.4 with accurate in phase.

In order to be able to transfer the respective piece good S, $S_v$, $S_n$ aligned, it is already placed on the delivery device 1.2 aligned parallel to the longitudinal axis $L_A$ of the discharge device 1.4 in the embodiment shown. Therefore, the virtual rectangle $V_R$ is always aligned in such a way that it is parallel to the longitudinal axis $L_A$ of the discharge device 1.4, regardless of the actual orientation of the respective piece good S, $S_v$, $S_n$.

To minimize the control effort, a virtual center point $V_M$ of the virtual rectangle $V_R$ is calculated and, based on the moment of delivery $t_1$ and the position of the virtual center point $V_M$ on the delivery device 1.2, the speed of each of the plurality of distancing conveyors 1.3.1 is controlled in such a way that the respective piece good S, $S_v$, $S_n$ is transferred to the discharge device 1.4 at the transfer section 1.3.2 of the distancing device 1.3 accurate in phase.

The control of the speed of each of the plurality of distancing conveyors 1.3.1 is controlled by the control unit 2 shown, so that the virtual center point $V_M$ is transferred to the assigned delivery place 1.4.2 of the discharge device 1.4 such that the virtual center point $V_M$ and thus the respective piece good S, $S_v$, $S_n$ comes to rest essentially centrally with respect to the longitudinal axis $L_A$ of the discharge device 1.4 on the assigned delivery place 1.4.2 an d therefore accurate in phase.

To prevent already occupied delivery places 1.4.2 from being occupied twice, the delivery places 1.4.2 on the discharge device 1.4 can be monitored by a second sensor 2.2 and a respective piece good S, $S_v$, $S_n$ can already be assigned to an unoccupied delivery place 1.4.2, preferably a conveyor tray, on the delivery device 1.2 by the control unit 2. Here, the delivery places 1.4.2 can be monitored by the further sensor 2.2 and the delivery device 1.2 and/or the distancing conveyors 1.3.1 can be operated in stop-and-go mode so that the piece good S, $S_v$, $S_n$ can each be transferred to a free delivery place 1.4.2 on the discharge device 1.4.

Figure 7:
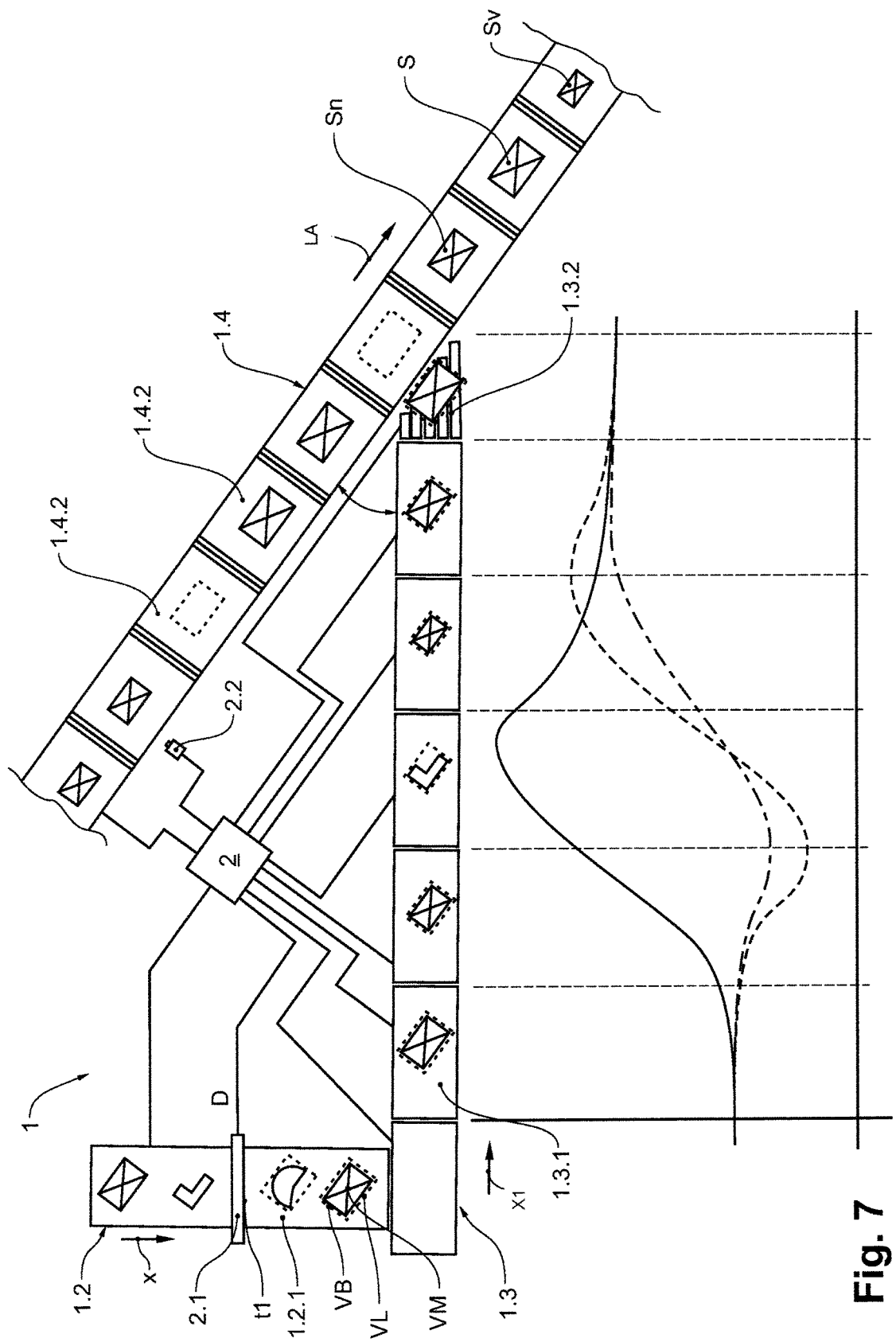
FIG. 7 shows a schematic view of the speed profiles of the distancing device of the embodiment of the conveying system according to FIG. 6.

FIG. 7 shows a schematic representation of the speed profiles of the respective piece good S, $S_v$, $S_n$ on the distancing device 1.3 of the conveying system 1. The virtual length $V_L$ is determined based on the geometrical information D of the first sensor 2.1 and if the virtual length $V_L$ falls below the length $L_S$ of a delivery place 1.4.2, the distancing conveyors 1.3.1 are controlled in such a way that the virtual center point $V_M$ comes to lie essentially centrally on the assigned delivery place 1.4.2 during transfer accurate in phase.

If the virtual length $V_L$ exceeds the length $L_S$ of a delivery place 1.4.2, the distancing conveyors 1.3.1 are controlled in such a way that the virtual center point $V_M$ comes to lie essentially centrally between two successive conveyor trays 1.4.2 during phase transfer accurate in phase. The actual layout of the respective piece good S, $S_v$, $S_n$ is detected by the first sensor 2.1 in the form of a light grid and the virtual layout of the respective piece good S, $S_v$, $S_n$ is calculated by the control unit 2.

The individual speed control of the distancing conveyors 1.3.1 ensures that the respective piece good S, $S_v$, $S_n$ is aligned within the cycle in such a way that it comes to rest within the phase of the conveyor tray 1.4.2 when it is transferred to the conveyor tray 1.4.2. The plurality of distancing conveyors 1.3.1 of the distancing device 1.3 are accelerated or decelerated in such a way that the velocity profile of the respective piece good S, $S_v$, $S_n$ corresponds to a higher order, preferably fifth order, polynomial equation.

Figure 8:
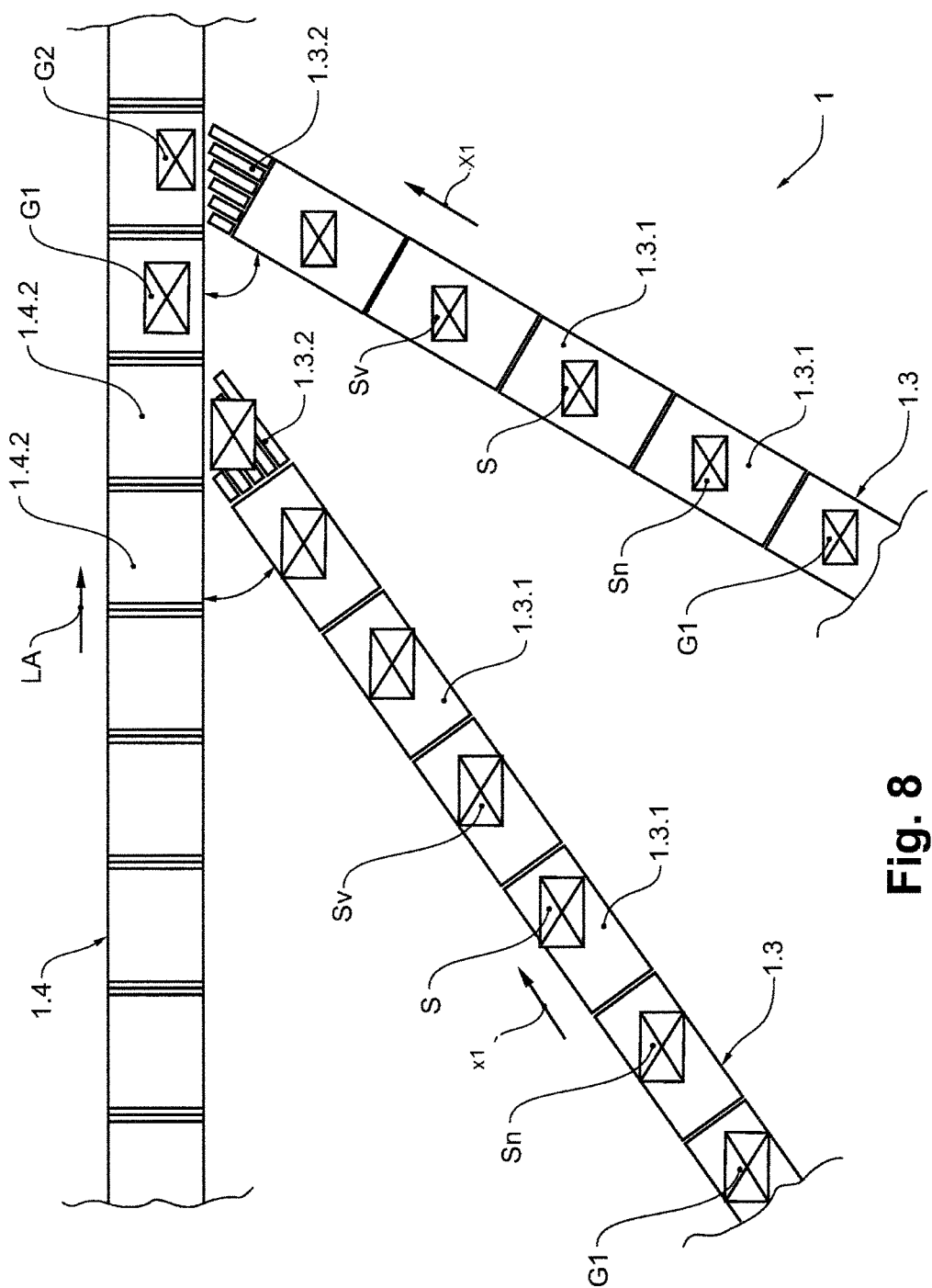
FIG. 8 shows a schematic view of a further embodiment of the conveying system with several distancing devices.

At least two adjacent distancing conveyors 1.3.1 of the plurality of distancing conveyors 1.3.1 can be at least temporarily coupled by the control system to form a virtual distancing conveyor if the functional length $L_f$ of the piece good S, $S_v$, $S_n$ exceeds the length of one of the distancing conveyors 1.3.1 along the conveying direction $x_{.1}$ FIG. 8 shows a schematic representation of a further embodiment of the conveying system 1 with several distancing devices 1.3. Depending on the design of the conveying system 1, several distancing devices 1.3 can load a discharge device 1.4. Therefore, some of the delivery places 1.4.2 on the discharge device 1.4 may already be occupied. $A_S$ can be seen in FIG. 8, the piece good items S, $S_v$, $S_n$ are each placed on the delivery device 1.2 so that they are already aligned on the delivery device 1.2 and the respective distancing device 1.3 parallel to the longitudinal axis $L_A$ of the discharge device 1.4.

In the embodiment shown, the distancing device 1.3 comprises a plurality of distancing conveyors 1.3.1, wherein only one piece good S, $S_v$, $S_n$ is provided on each of the plurality of distancing conveyors 1.3.1. If only piece good S, $S_v$, $S_n$ of a certain size category $G_1$, $G_2$ and/or a product category is provided on each distancing device 1.3, a pattern of piece good S, $S_v$, $S_n$ of different size categories $G_1$, $G_2$ and/or product categories can be achieved by an alternating transfer of piece good S, $S_v$, $S_n$ to the discharge device 1.4.

The distancing devices 1.3 are angled with respect to the longitudinal axis $L_A$ of the discharge device 1.4 and are arranged adjacent to the discharge device 1.4 with an offset to each other along the longitudinal axis $L_A$. The speeds of the individual distancing conveyors 1.3.1 of the distancing devices 1.3 are controlled in such a way that the respective piece good S, $S_v$, $S_n$ at the transfer section 1.3.2 of the respective distancing conveyor 1.3 is transferred to a delivery place 1.4.2, in the embodiment shown of the discharge device 1.4 in the form of conveyor trays 1.4.2, accurate in phase.

Figure 9:
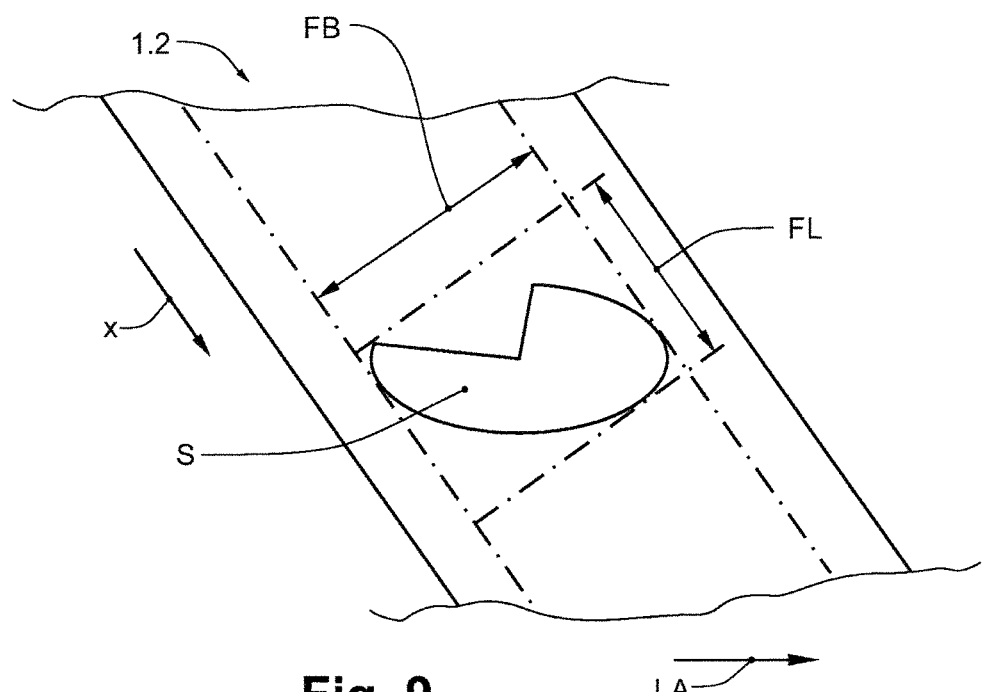
FIG. 9 shows a schematic view of the determination of the functional length and width along the conveying direction of the delivery device.

FIG. 9 shows a schematic representation of the detection of the functional length $L_f$ and the functional width $B_f$ along the conveying direction x of the delivery device 1.2. The functional length $L_f$ and functional width $B_f$ are detected by a first sensor 2.1 in the form of a light grid. The functional length $L_f$ corresponds to the measured length of a respective piece good S, $S_v$, $S_n$ along the conveying direction x of the delivery device 1.2. The functional width $B_f$ is measured orthogonally to this; this corresponds to the measured width of the respective piece good S, $S_v$, $S_n$ perpendicular to the conveying direction x of the delivery device 1.2.

In the case that the delivery device 1.2 is arranged parallel to the discharge device 1.4, the functional length $L_f$ corresponds to the virtual length $V_L$ and the functional width $B_f$ corresponds to the virtual width $V_B$. In the embodiment shown, the distancing device 1.3 is arranged at an angle to the discharge device 1.4. Since the virtual rectangle $V_R$ is always mathematically aligned parallel to the longitudinal axis $L_A$ of the discharge device 1.4, the functional length $L_f$ and the functional width $B_f$ is converted. The virtual rectangle $V_R$ is always rotated by the angle with respect to the conveying direction x of the delivery device 1.2, which corresponds to the angle enclosed by the distancing conveyor 1.3 and the discharge device 1.4.

Figure 10:
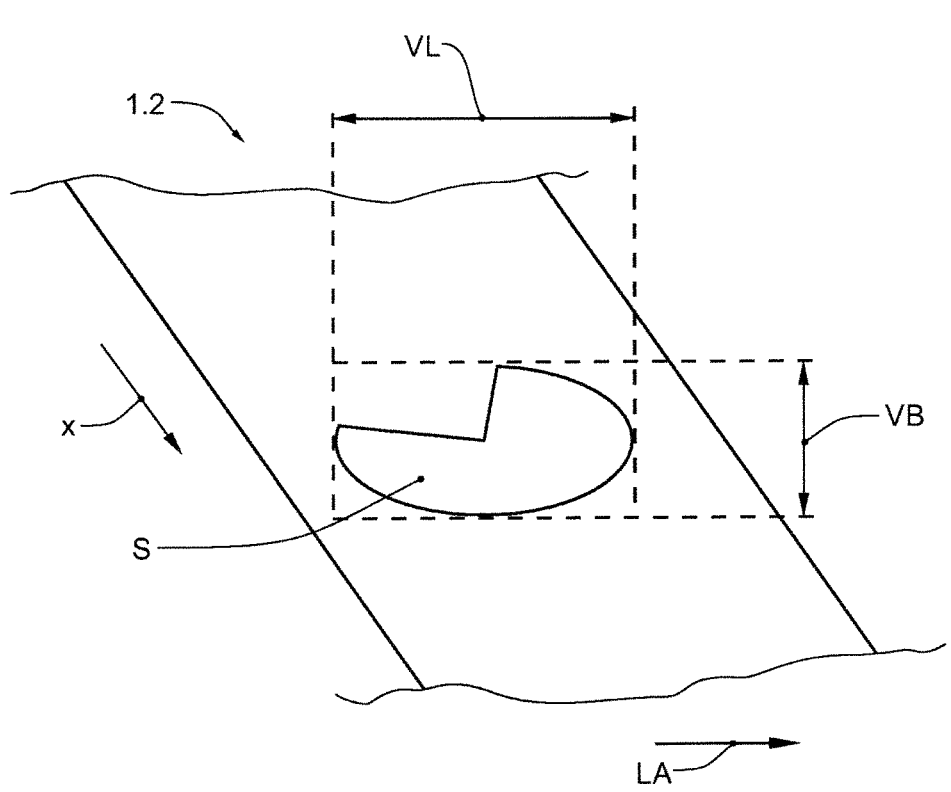
FIG. 10A shows a schematic view of the calculation of the virtual rectangle parallel to the longitudinal axis of the discharge device.

FIG. 10 shows a schematic representation of the calculation of the virtual rectangle, aligned parallel to the longitudinal axis $L_A$ of the discharge device 1.4. By a first sensor 2.1, a virtual length $V_L$ and a virtual width $V_B$ as well as a moment of delivery $t_1$ of the respective piece good S, $S_v$, $S_n$ are detected at or, as shown in FIG. 6, upstream of the transfer section 1.2.1 of the delivery device 1.2. The virtual length $V_L$ is detected parallel to the longitudinal axis $L_A$ of the discharge device 1.4 and the virtual width $V_B$ is detected perpendicular to the longitudinal axis $L_A$ of the discharge device 1.4. If the first sensor 2.1, as in the embodiment shown in the form of a light grid, is not arranged parallel to the longitudinal axis $L_A$ of the discharge device 1.4, the functional length $L_f$ detected along the conveying direction x of the delivery device 1.2 is converted into the virtual length $V_L$ and a functional width $B_f$ detected perpendicular thereto is converted into the virtual width $V_B$, preferably by a coordinate transformation.

Based on the recorded virtual length $V_L$ and the virtual width $V_B$, a virtual layout of the respective piece good S, $S_v$, $S_n$ is calculated in the form of a virtual rectangle $V_R$, which is minimized to the virtual length $V_L$ and the virtual width $V_B$. The virtual rectangle $V_R$ is approximated to the piece good in such a way that the respective piece good S, $S_v$, $S_n$ is completely enclosed by the virtual rectangle $V_R$, preferably approximated in such a way that it is just barely enclosed.

The invention claimed is:

1. A method for transferring piece good (S, $S_v$, $S_n$) accurate in phase to a discharge device (1.4) arranged along a longitudinal axis ($L_A$), comprising the following steps:
  delivering of the piece good (S, $S_v$, $S_n$) by a delivery device (1.2) along a conveying direction (x) of the delivery device (1.2);
  determining a virtual length ($V_L$) and a virtual width ($V_B$) as well as a moment of delivery (t1) of the respective piece good (S, $S_v$, $S_n$) by a first sensor (2.1) at a transfer section (1.2.1) or upstream of the transfer section (1.2.1) of the delivery device (1.2), whereby the virtual length ($V_L$) being detected parallel to the longitudinal axis ($L_A$) of the discharge device (1.4) and the virtual width ($V_B$) being detected perpendicular to the longitudinal axis ($L_A$) of the discharge device (1.4);
  calculating a virtual layout of the respective piece good (S, $S_v$, $S_n$) in the form of a virtual rectangle (VR), which is minimized to the virtual length ($V_L$) and the virtual width ($V_B$) in such a way that the respective piece good (S, $S_v$, $S_n$) is completely enclosed by the virtual rectangle ($V_R$);
  transferring the delivered piece good (S, $S_v$, $S_n$) accurate in cycle piece good from the transfer section (1.2.1) of the delivery device (1.2) to a distancing device (1.3), which comprises a plurality of distancing conveyors (1.3.1), which are arranged successively along a conveying direction ($x_1$) of the distancing device (1.3);
  controlling the speed of each of the distancing conveyors (1.3.1) of the plurality of distancing conveyors (1.3.1) for transferring the piece good (S, $S_v$, $S_n$) accurate in phase from a transfer section (1.3.2) of the distancing device (1.3);
  transferring the respective piece good (S, $S_v$, $S_n$) accurate in phase from the transfer section (1.3.2) of the spacing conveyor (1.3) to a discharge device (1.4).

2. The method according to claim 1, wherein the virtual rectangle ($V_R$) is aligned parallel to the longitudinal axis ($L_A$) of the discharge device (1.4), irrespective of the actual alignment of the respective piece good (S, $S_v$, $S_n$) on the delivery device (1.2).

3. The method according to claim 1, wherein a virtual center point ($V_M$) of the virtual rectangle ($V_R$) is calculated and, based on the moment of delivery (t1) and the position of the virtual center point ($V_M$) on the delivery device (1.2), the speed of the plurality of distancing conveyors (1.3.1) is controlled such that at the transfer section (1.3.2) of the distancing device (1.3) the respective piece good (S, $S_v$, $S_n$) is transferred to the discharge device (1.4) accurate in phase.

4. The method according to claim 3, wherein the speed of the respective distancing conveyor (1.3.1) of the plurality of distancing conveyors (1.3.1) is controlled by the control unit (2) such that the virtual center point ($V_M$) is transferred to an assigned delivery place (1.4.2) of the discharge device (1.4) accurate in phase in such a way that the virtual center point ($V_M$), and thus the respective piece good (S, $S_v$, $S_n$), comes to lie essentially centrally with respect to the longitudinal axis ($L_A$) of the discharge device (1.4) on the assigned delivery place (1.4.2).

5. The method according to claim 3, wherein on the discharge device (1.4), upstream of the transfer section (1.3.2) of the distancing device (1.3), delivery places (1.4.2) on the discharge device (1.4) are monitored and a respective piece good (S, $S_v$, $S_n$) is already assigned to an unoccupied delivery place (1.4.2), or a conveyor tray, on the delivery device (1.2), by the control unit (2).

6. The method according to claim 5, wherein the delivery places (1.4.2) are monitored by a further sensor (2.2) and the delivery device (1.2) and the distancing conveyors (1.3.1) are operated in a stop-and-go mode in such a way that the piece good (S, $S_v$, $S_n$) is transferred to the assigned delivery place (1.4.2) on the discharge device (1.4) accurate in phase.

7. The method according to claim 4, wherein the length of the respective virtual rectangle ($V_R$) is determined and:
  a. if the virtual length ($V_L$) is shorter than the length ($L_S$) of a delivery place (1.4.2), the virtual center point ($V_M$) is transferred essentially centrally phase accurate to the assigned delivery place (1.4.2) along the longitudinal axis ($L_A$) of the discharge device (1.4), or
  b. if the virtual length ($V_L$) is longer than the length (Ls) of a delivery place (1.4.2), the virtual center point ($V_M$) is transferred phase accurate essentially centrally between two successive delivery places (1.4.2) along the longitudinal axis ($L_A$) of the discharge device (1.4).

8. The method according to claim 1, wherein the actual layout of the respective piece good (S, $S_v$, $S_n$) is detected by an optical sensor (2.1), a light grid, or laser grid, and the virtual layout of the respective piece good (S, $S_v$, $S_n$) is calculated by the control unit (2).

9. The method according to claim 1, wherein the piece good (S, $S_v$, $S_n$) is placed on the delivery device (1.2) in such a way that it is already aligned on the delivery device (1.2) parallel to the longitudinal axis ($L_A$) of the discharge device (1.4).

10. The method according to claim 1, wherein the piece good (S, $S_v$, $S_n$) is transferred discontinuously to the delivery device (1.2) by at least one feeding device (1.1) in such a way that the respective piece good (S, $S_v$, $S_n$) is transferred to the delivery device (1.2) within a delivery cycle (A) and comes to rest on the delivery device (1.2).

11. The method according to claim 1, wherein the feeding device (1.1) comprises a plurality of belt conveyors (1.1.1), whereby on each of the plurality of belt conveyors (1.1.1) piece good (S, $S_v$, $S_n$) of only one certain size category ($G_1$, $G_2$) and/or a product category is provided, so that a pattern of piece good (S, $S_v$, $S_n$) of different size categories ($G_1$, $G_2$) and/or product categories is achieved by an alternating transfer of piece good (S, $S_v$, $S_n$) to the delivery device (1.2).

12. The method according to claim 1, wherein a plurality of distancing devices (1.3) are angled with respect to the longitudinal axis ($L_A$) of the discharge device (1.4) and are arranged adjacent to the discharge device (1.4) with an offset relative to one another along the longitudinal axis ($L_A$).

13. The method according to claim 1, wherein the discharge device (1.4) is a tray conveyor (1.4.1) with a plurality of discharge places as conveyor trays (1.4.2) and the respective piece good (S, $S_v$, $S_n$) is transferred accurately in phase at the transfer section (1.3.2) of the spacing conveyor (1.3) to one of the conveyor trays (1.4.2) of the plurality of conveyor trays (1.4.2).

14. The method according to claim 13, wherein the respective piece good (S, $S_v$, $S_n$) is aligned within the cycle by the plurality of distancing conveyors (1.3.1) of the distancing device (1.3) in such a way that it comes to lie within the phase of the respective conveyor tray (1.4.2) when it is transferred to the respective conveyor tray (1.4.2).

15. The method according to claim 1, wherein the plurality of distancing conveyors (1.3.1) of the distancing device (1.3) are accelerated or decelerated such that the velocity profile of the respective piece good (S, $S_v$, $S_n$) corresponds to a polynomial equation of fifth order.

16. The method according to claim 1, wherein at least two adjacent distancing conveyors (1.3.1) of the plurality of distancing conveyors (1.3.1) are at least temporarily coupled by the control system to form a virtual distancing conveyor when the functional length ($L_f$) of the piece good (S, $S_v$, $S_n$) exceeds the length of one of the at least two distancing conveyors (1.3.1) along the conveying direction ($x_1$) of the distancing conveyor (1.3.1).

17. A conveying system (1) for carrying out the method according to claim 1, comprising a delivery device (1.2) for delivering the piece good (S, $S_v$, $S_n$) along a conveying direction (x) of the delivery device (1.2), a control unit (2) which is interconnected to at least one first sensor (2.1) for determining a virtual length ($V_L$) and a virtual width ($V_B$) as well as a moment of delivery (t1) of the respective piece good (S, $S_v$, $S_n$) at or before a transfer section (1.2.1) of the delivery device (1.2), wherein the transfer section (1.2.1) of the delivery device (1.2) is configured to transfer the delivered piece good (S, $S_v$, $S_n$) to a distancing device (1.3), which comprises a plurality of distancing conveyors (1.3.1) along the conveying direction ($x_1$), whereby the speed of each of the distancing conveyors (1.3.1) of the plurality of distancing conveyors (1.3.1) being controllable for the phase accurate transfer of the piece good (S, $S_v$, $S_n$) from a transfer section (1.3.2) of the distancing device (1.3) to a discharge device (1.4), whereby the control unit (2) is configured to calculate a virtual layout of the respective piece good (S, $S_v$, $S_n$) in the form of a virtual rectangle ($V_R$) and the virtual rectangle ($V_R$) is aligned parallel to the longitudinal axis ($L_A$) of the discharge device (1.4) independently of the actual orientation of the respective piece good (S, $S_v$, $S_n$).

18. A control unit (2) for controlling a conveying system (1) for transferring piece good (S, $S_v$, $S_n$) accurate in phase, the control unit (2) being configured for,
    a. receiving geometrical information (D) of a first sensor (2.1) which is configured to detect the functional length ($L_f$) and the functional width ($L_B$) and/or a virtual layout as well as the moment of delivery ($t_1$) of the respective piece good (S, $S_v$, $S_n$) at or upstream of a transfer section (1.2.1) of the delivery device (1.2);
    b. receiving occupancy data (B) in order to determine unoccupied transport spaces, preferably in the form of trays n, on the discharge device (1.4) upstream of a transfer section (1.3.2) of the distancing device (1.3);
    c. transferring control signals (E) to each of the plurality of distancing conveyors (1.3.1) of the distancing device (1.3) to control the speed thereof, wherein
    d. the control unit (2) calculates, based on the geometry information (D) detected by the first sensor (2.1) the virtual layout of the respective piece good (S, $S_v$, $S_n$) in the form of a virtual rectangle ($V_R$), which is minimized to the virtual length ($V_L$) and the virtual width ($V_B$), wherein the respective piece good (S, $S_v$, $S_n$) is completely enclosed by the virtual rectangle ($V_R$) and, controls based on the virtual rectangle ($V_R$) and the moment of delivery (t1) the plurality of distancing conveyors (1.3.1) by the control signals (E) in such a way that the respective piece good (S, $S_v$, $S_n$) can be transferred accurate in phase to the assigned delivery place (1.4.2) on the discharge device (1.4).

19. The control unit (2) according to claim 18, wherein the control unit (2) is configured to constantly align the virtual rectangle ($V_R$) in such a way that it is aligned parallel to the longitudinal axis ($L_A$) of the discharge device (1.4), irrespective of the actual alignment of the respective piece good (S, $S_v$, $S_n$) on the delivery device (1.2).

20. The control unit (2) according to claim 18, wherein the control unit (2) is configured to receive the occupancy data (B) from a second sensor (2.2) which detects unoccupied delivery places (1.4.2) on a discharge device (1.4) upstream of a transfer section (1.3.2) of the distancing device (1.3) or to determine unoccupied delivery places (1.4.2) on the basis of an occupancy plan of the discharge device (1.4).

21. The control unit (2) according to claim 18, wherein the control unit (2) is configured to calculate a virtual center point ($V_M$) of the virtual rectangle ($V_R$) and, based on the moment of delivery (t1) and the virtual center point ($V_M$), to calculate the position of the respective piece good (S, $S_v$, $S_n$) on the delivery device (1.2) and thereby control the speed of the plurality of distancing conveyors (1.3.1) in such a way that at the transfer section (1.3.2) of the distancing device (1.3) the respective piece good (S, $S_v$, $S_n$) is transferred accurate in phase to a delivery place (1.4.2) of the discharge device (1.4).

22. The control unit (2) according to claim 18, wherein the control unit (2) is configured to dynamically control the speed of the plurality of distancing conveyors (1.3.1) in such a way that the virtual center point ($V_M$) is transferred to the assigned delivery place (1.4.2) of the discharge device (1.4) in such a way that the virtual center point ($V_M$) and thus the respective piece good (S, $S_v$, $S_n$) comes to rest essentially centrally with respect to the longitudinal axis ($L_A$) of the discharge device (1.4) on the assigned delivery place (1.4.2).

23. The control unit (2) according to claim 20, wherein the control unit (2) is configured to assign a respective piece good (S, $S_v$, $S_n$) to an unoccupied delivery place (1.4.2) on the discharge device (1.4), or a tray, already on the delivery device (1.2) based on the occupancy data (B) of the second sensor (2.2).

24. The control unit (2) according to claim 23, wherein the control unit (2) is configured to operate the delivery device (1.2) and the distancing conveyors (1.3.1) in a stop-and-go mode in order to transfer the piece good (S, $S_v$, $S_n$) in each case to the assigned unoccupied delivery place (1.4.2) on the discharge device (1.4).

25. The control unit (2) according to claim 18, wherein the control unit (2) is configured to calculate, based on the geometrical information (D) of the first sensor (2.1), whether the virtual length ($V_L$) falls below or exceeds the length ($L_S$) of a delivery place (1.4.2) and based thereon:
    a. to transfer the respective piece good (S, $S_v$, $S_n$) along the longitudinal axis ($L_A$) of the discharge device (1.4) essentially centrally to the assigned delivery place (1.4.2) if the virtual length ($V_L$) is less than the length (Ls) of a delivery place (1.4.2), or
    b. to transfer the respective piece good (S, $S_v$, $S_n$) along the longitudinal axis ($L_A$) of the discharge device (1.4) essentially centrally between two successive delivery places (1.4.2) If the virtual length ($V_L$) exceeds the length ($L_S$) of a delivery place (1.4.2).

\* \* \* \* \*